United States Patent
Baek et al.

(10) Patent No.: US 12,520,169 B2
(45) Date of Patent: Jan. 6, 2026

(54) APPARATUS AND METHOD FOR ADAPTIVELY APPLYING INTERFERENCE MITIGATION ALGORITHM IN MOBILE COMMUNICATION SYSTEM

(71) Applicant: SAMSUNG ELECTRONICS CO., LTD., Suwon-si (KR)

(72) Inventors: Jooyoung Baek, Suwon-si (KR); Dongwoo Lee, Suwon-si (KR); Hoon Huh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 573 days.

(21) Appl. No.: 17/972,024

(22) Filed: Oct. 24, 2022

(65) Prior Publication Data

US 2023/0105521 A1   Apr. 6, 2023

Related U.S. Application Data

(63) Continuation of application No. PCT/KR2022/013503, filed on Sep. 8, 2022.

(30) Foreign Application Priority Data

Oct. 1, 2021  (KR) ........................ 10-2021-0130779

(51) Int. Cl.
*H04W 24/02*   (2009.01)
*H04B 7/024*   (2017.01)
(Continued)

(52) U.S. Cl.
CPC ............ *H04W 24/02* (2013.01); *H04B 7/024* (2013.01); *H04L 5/1469* (2013.01)

(58) Field of Classification Search
None
See application file for complete search history.

(56) References Cited

U.S. PATENT DOCUMENTS 11,864,218 B1 * 1/2024 Kwok ................. H04W 72/541
2016/0302209 A1 * 10/2016 Behravan ............ H04W 72/541
(Continued)

FOREIGN PATENT DOCUMENTS

JP   2012-239009   12/2012
JP   2019-092085   6/2019
(Continued)

OTHER PUBLICATIONS

Search Report dated Dec. 16, 2022 in counterpart International Patent Application No. PCT/KR2022/013503.

*Primary Examiner* — Jeffrey M Rutkowski
*Assistant Examiner* — Ning Li
(74) *Attorney, Agent, or Firm* — Nixon & Vanderhye, P.C.

(57) ABSTRACT

An example base station in a wireless communication system includes a communication module for communicating with a user terminal and a cooperative base station, the base station communicating with the user terminal in a first frequency band, and the cooperative base station communicating with the user terminal in a second frequency band, a memory for storing computer-executable instructions, and a processor configured to execute the computer-executable instructions by accessing the memory, wherein when the instructions are executed by the processor, the processor is configured to control the base station to receive uplink information and downlink information in the first frequency band and the second frequency band for the user terminal from the user terminal and the cooperative base station, determine whether the user terminal is a terminal in which interference may occur, based on a combination of the first frequency band and the second frequency band, and if the user terminal is a terminal in which interference may occur, determine whether to apply an interference avoidance algo- (Continued)

rithm to the user terminal based on the uplink information and the downlink information.

18 Claims, 11 Drawing Sheets

(51) Int. Cl.
*H04L 5/00* (2006.01)
*H04L 5/14* (2006.01)

(56) References Cited

U.S. PATENT DOCUMENTS

| | | | | |
|---|---|---|---|---|
| 2016/0351182 | A1* | 12/2016 | Heo | G10K 11/1783 |
| 2017/0245317 | A1* | 8/2017 | Lee | H04W 24/08 |
| 2019/0053130 | A1* | 2/2019 | Guo | H04L 1/0026 |
| 2019/0081657 | A1* | 3/2019 | Zeng | H04W 52/146 |
| 2020/0128622 | A1* | 4/2020 | Song | H04B 17/327 |
| 2020/0163142 | A1* | 5/2020 | Ryoo | H04W 76/15 |
| 2020/0170077 | A1* | 5/2020 | Lee | H04W 72/0446 |
| 2020/0177230 | A1 | 6/2020 | Zeng et al. | |
| 2020/0252950 | A1 | 8/2020 | Yang et al. | |
| 2020/0359399 | A1 | 11/2020 | Zhang | |
| 2020/0367258 | A1 | 11/2020 | Baek et al. | |
| 2021/0022073 | A1 | 1/2021 | Kwok et al. | |
| 2021/0282092 | A1 | 9/2021 | Wei et al. | |
| 2022/0271883 | A1* | 8/2022 | Bin Sediq | H04L 1/1887 |
| 2023/0100287 | A1* | 3/2023 | Wang | H04B 17/336 370/329 |
| 2023/0345436 | A1* | 10/2023 | Lim | H04L 5/0005 |

FOREIGN PATENT DOCUMENTS

| | | |
|---|---|---|
| KR | 10-2020-0061078 | 6/2020 |
| KR | 10-2021-0007469 | 1/2021 |
| WO | 2021/019276 | 2/2021 |

\* cited by examiner

APPARATUS AND METHOD FOR ADAPTIVELY APPLYING INTERFERENCE MITIGATION ALGORITHM IN MOBILE COMMUNICATION SYSTEM

CROSS-REFERENCE TO RELATED APPLICATIONS

This application is a continuation application of International Application No. PCT/KR2022/013503 designating the United States, filed on Sep. 8, 2022, in the Korean Intellectual Property Receiving Office and claiming priority to Korean Patent Application No. 10-2021-0130779, filed on Oct. 1, 2021, at the Korean Intellectual Property Office, the disclosures of which are incorporated by reference herein in their entireties.

BACKGROUND

1. Field

The disclosure relates to an apparatus for adaptively applying an interference mitigation algorithm in a mobile communication system and an operating method thereof, and more particularly, to a method of adaptively applying an inter-modulation distortion (IMD) avoidance algorithm or a harmonic interference (HI) avoidance algorithm to a user terminal.

2. Description of Related Art

Since 4G communication systems have been commercialized, efforts are being made to develop an improved 5G communication system or a pre-5G communication system to meet the increasing demand for wireless data traffic. A 5G communication system or pre-5G communication system is called a Beyond 4G Network communication system or a Post LTE system. To achieve a high data transmission rate, the system may be implemented using an ultra-high frequency (mmWave) band (e.g., a 60 GHz band).

To mitigate the path loss of radio waves in the ultra-high frequency band and to increase the propagation distance of radio waves, technologies such as beamforming, massive multiple-input and multiple-output (MIMO), full dimensional MIMO (FD-MIMO), an array antenna, analog beamforming, and a large scale antenna are being considered for the 5G communication system. In addition, to improve the 5G communication system network, technologies such as an advanced small cell, a cloud radio access network (cloud RAN), an ultra-dense network, Device to Device communication (D2D), wireless backhaul, a moving network, cooperative communication, Coordinated Multi-Points (CoMP), and interference cancellation are being developed.

With the advancement of various RAN technologies, a terminal may support communication through several frequency bands, and interference such as the uplink (UL) transmission of the terminal in a particular combination of frequency bands affecting downlink (DL) reception performance may occur. IMD refers, for example, to interference that affects the reception of a low frequency DL within the terminal when the terminal simultaneously transmits a low frequency (e.g., LTE) UL and a high frequency (e.g., NR) UL, where the low frequency UL and the high frequency UL may be an aggressor, and the low frequency DL and the high frequency DL may be a victim. HI refers, for example, to interference that affects the reception of a high frequency DL corresponding to an integer multiple of the corresponding frequency when the terminal transmits a low frequency UL, where the low frequency UL may be an aggressor, and the high frequency DL may be a victim.

To improve the communication quality of the user terminal, various methods for avoiding IMD and HI are being studied.

SUMMARY

Although there are various methods to avoid inter-modulation distortion (IMD) or harmonic interference (HI), when an interference avoidance algorithm is applied, resources that can be used in the time axis and/or the frequency axis for interference avoidance may be limited in the corresponding terminal.

Embodiments of the disclosure may provide an apparatus for determining a degree of influence of interference of a user terminal based on uplink (UL) information and downlink (DL) information and applying an interference avoidance algorithm when the degree of influence of the interference is high.

However, the technical aspects are not limited to the aforementioned aspects, and other technical aspects may be present.

According to various example embodiments, a base station in a wireless communication system includes a communication module for communicating with a user terminal and a cooperative base station, the base station communicating with the user terminal in a first frequency band, and the cooperative base station communicating with the user terminal in a second frequency band, a memory for storing computer-executable instructions, and a processor configured to execute the computer-executable instructions by accessing the memory, wherein when the instructions are executed by the processor, the processor is configured to control the base station to receive UL information and DL information in the first frequency band and the second frequency band for the user terminal from the user terminal and the cooperative base station, determine whether the user terminal is a terminal in which interference may occur, based on a combination of the first frequency band and the second frequency band, and, if the user terminal is determined to be a terminal in which interference may occur, determine whether to apply an interference avoidance algorithm to the user terminal based on the UL information and the DL information.

According to various example embodiments, the processor may be configured to control the base station to determine whether IMD or HI may occur in the frequency band combination based on a 3rd generation partnership project (3GPP) standard.

According to various example embodiments, the processor may be configured to control the base station to determine a UL electric field state and a DL electric field state of the user terminal based on the UL information and the DL information, and determine whether to apply the interference avoidance algorithm to the user terminal based on the UL electric field state and the DL electric field state.

According to various example embodiments, when the UL electric field state and the DL electric field state satisfy a predetermined condition, the processor may be configured to control the base station to determine not to apply the interference avoidance algorithm to the user terminal.

According to various example embodiments, the predetermined condition may be determined to be strong a threshold number of times or more, consecutively.

According to various example embodiments, the processor may be configured to control the base station to determine the UL electric field state based on power head room (PHR) information of the UL information, and determine the DL electric field state based on channel quality indicator (CQI) information of the DL information.

According to various example embodiments, the processor may be configured to control the base station to determine the UL electric field state based on total full Tx power information of the UL information, and determine the DL electric field state based on CQI information and modulation coding rate (MCS) information of the DL information.

According to various example embodiments, the interference avoidance algorithm may be a single UL operation (SUO) scheme for operating a UL of long term evolution (LTE) frequency division duplexing (FDD) as a UL of time division duplexing (TDD) for the user terminal.

According to various example embodiments, the UL information may include at least one of reception signal-to-interference plus noise ratio (SINR) information, MCS information, PHR information, or total full Tx power information of a physical UL shared channel (PUSCH).

According to various example embodiments, the DL information may include at least one of CQI information, MCS information, rank indicator (RI) information, reference signals received power (RSRP) information, or measurement report (MR) information.

According to various example embodiments, the base station may be an LTE base station and the cooperative base station may be a new radio (NR) base station, or the base station may be an NR base station and the cooperative base station may be an LTE base station, and the base station and the cooperative base station may control different cell groups and transmit and receive signals simultaneously with the user terminal.

According to various example embodiments, an operating method of a base station in a wireless communication system includes communicating with a user terminal in a first frequency band and communicating with a cooperative base station, the cooperative base station communicating with the user terminal in a second frequency band, determining whether the user terminal is a terminal in which interference may occur, based on a combination of the first frequency band and the second frequency band, and when the user terminal is determined to be a terminal in which the interference may occur, receiving UL information and DL information in the first frequency band and the second frequency band for the user terminal from the user terminal and the cooperative base station, and determining whether to apply an interference avoidance algorithm to the user terminal based on the UL information and the DL information.

According to various example embodiments, the determining of whether the user terminal is a terminal in which the interference may occur may include determining whether IMD or HI may occur in the frequency band combination based on a 3GPP standard.

According to various example embodiments, the determining of whether to apply the interference avoidance algorithm to the user terminal may include determining a UL electric field state and a DL electric field state of the user terminal based on the UL information and the DL information, and determining whether to apply the interference avoidance algorithm to the user terminal based on the UL electric field state and the DL electric field state.

According to various example embodiments, the determining of whether to apply the interference avoidance algorithm to the user terminal based on the UL electric field state and the DL electric field state may include, when the UL electric field state and the DL electric field state satisfy a predetermined condition, determining not to apply the interference avoidance algorithm to the user terminal.

According to various example embodiments, the determining of the UL electric field state and the DL electric field state based on the UL information and the DL information may include determining the UL electric field state based on PHR information of the UL information, and determining the DL electric field state based on CQI information of the DL information.

According to various example embodiments, the determining of the UL electric field state and the DL electric field state based on the UL information and the DL information may include determining the UL electric field state based on total full Tx power information of the UL information, and determining the DL electric field state based on CQI information and MCS information of the DL information.

According to various example embodiments, the interference avoidance algorithm may be an SUO scheme for operating a UL of LTE FDD as a UL of TDD for the user terminal.

According to various example embodiments, the base station may be an LTE base station and the cooperative base station may be an NR base station, or the base station may be an NR base station and the cooperative base station may be an LTE base station, and the base station and the cooperative base station may control different cell groups and transmit and receive signals simultaneously with the user terminal.

According to various example embodiments, an apparatus that does not apply an algorithm uniformly, but applies an algorithm adaptively for avoiding IMD or HI according to a degree of influence of interference of the user terminal may be provided.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
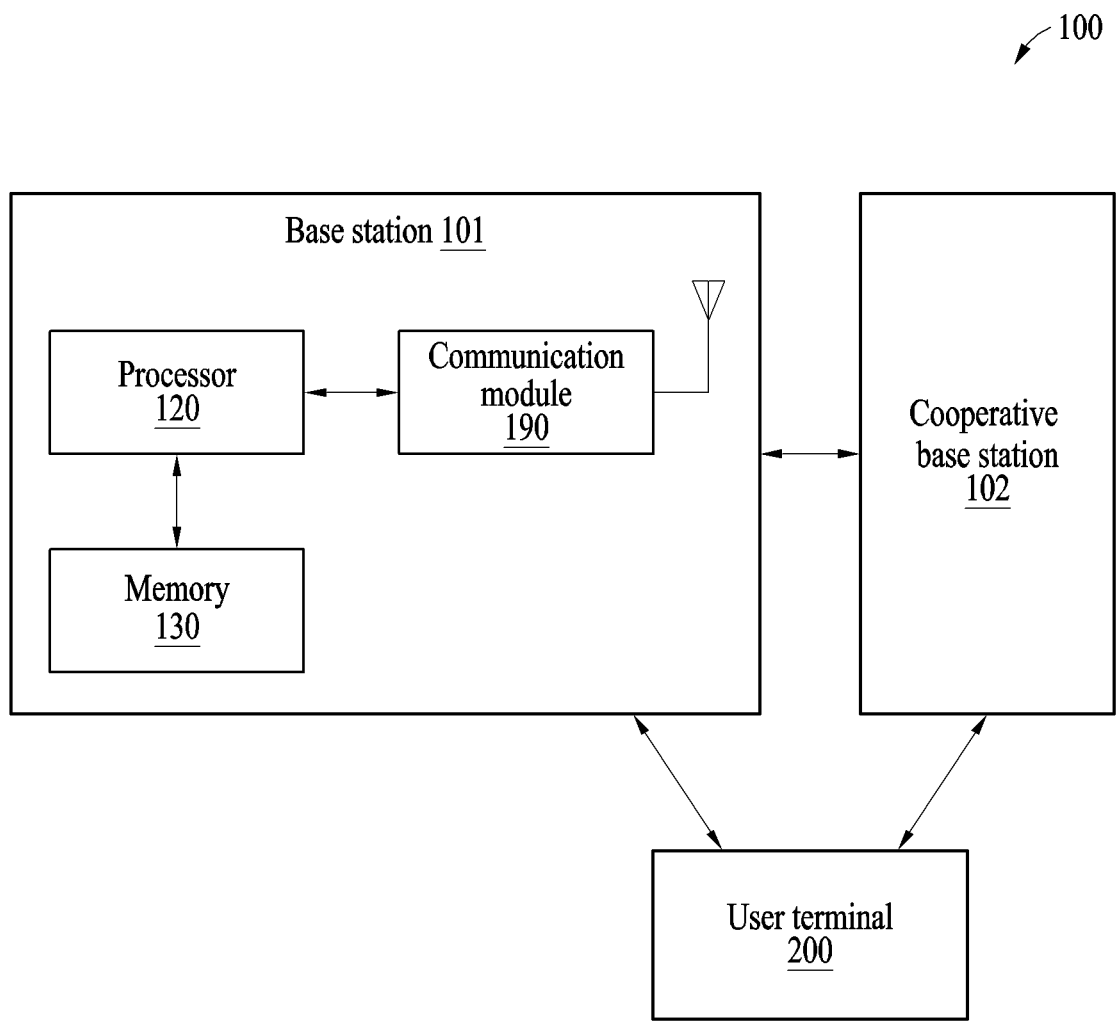
FIG. 1 is a block diagram illustrating an example base station in a wireless communication system, according to various embodiments.

Hereinafter, embodiments will be described in detail with reference to the accompanying drawings. When describing the embodiments with reference to the accompanying drawings, like reference numerals refer to like elements and any description related thereto will not be repeated. However, the accompanying drawings are not intended to limit the present disclosure to specific embodiments, and it should be understood that various modifications, equivalents, and/or alternatives of the embodiments of the present disclosure are included.

<Base Station in Wireless Communication System>

FIG. 1 is a block diagram illustrating an example base station 101 in a wireless communication system 100, according to various embodiments.

Referring to FIG. 1, the base station 101 may include a communication module 190 (e.g., including communication circuitry) for communicating with a user terminal 200 and a collaborative base station 102, a memory 130 for storing computer-executable instructions, and a processor 120 (e.g., including processing circuitry) for executing the computer-executable instructions by accessing the memory 130.

The base station 101 or the cooperative base station 102 may be a wireless communication device for communicating with the user terminal 200 in different frequency bands. For example, according to an embodiment, the base station 101 may be a long term evolution (LTE) base station that communicates with the user terminal 200 in a low frequency band, and the cooperative base station 102 may be a new radio (NR) base station that communicates with the user terminal 200 in a high frequency band. According to an embodiment, the base station 101 may be an NR base station that communicates with the user terminal 200 in a high frequency band, and the cooperative base station 102 may be an LTE base station that communicates with the user terminal 200 in a low frequency band. The base station 101 and the cooperative base station 102 may control different cell groups and transmit and receive signals simultaneously with the user terminal 200. The configuration of the cooperative base station 102 illustrated in FIG. 1 may correspond at least in part to the configuration of the base station 101. A communication method of the base station 101 and the cooperative base station 102 and frequency bands thereof will be described in detail with reference to FIG. 2.

According to an embodiment, the communication module 190 may process a function or operation for transmitting and receiving a signal through a wireless channel, and may be implemented as hardware or software, or a combination of hardware and software. For example, the communication module 190 may perform a conversion function for conversion between a baseband signal and a bit string according to a physical layer standard of the system 100. For example, when data is transmitted, a wireless communicator may generate complex symbols by encoding and modulating the transmitted bit string. In addition, when data is received, the communication module 190 may restore a received bit string through demodulation and decoding of a baseband signal.

According to an embodiment, the communication module 190 may up-convert a baseband signal into a radio frequency (RF) band signal and transmit it through an antenna, and down-convert an RF band signal received through the antenna into a baseband signal. In this example, the communication module 190 may include a transmit filter, a receive filter, an amplifier, a mixer, an oscillator, a digital-to-analog converter (DAC), an analog-to-digital converter (ADC), and the like. The communication module 190 may include a plurality of transmission and reception paths.

According to an embodiment, the communication module 190 may include at least one antenna array including a plurality of antenna elements. For example, the communication module 190 may further include a field programmable gate array (FPGA). An FPGA may refer, for example, to a semiconductor device including a programmable logic device. A programmable logic device may be programmed, for example, by duplicating logic gates such as AND, OR, XOR, NOT, etc. and more complex decoder functions. The FPGA may further include a flip-flop or memory.

According to an embodiment, the communication module 190 may include a digital unit and an analog unit in terms of hardware, and the analog unit may include a plurality of sub-units according to operating power, operating frequency, and the like. The digital unit may be implemented by at least one processor (e.g., a digital signal processor (DSP)).

According to an embodiment, all, or part of the communication module 190 may be referred to as a 'transmitter', a 'receiver', or a 'transceiver'. In addition, in the following description, any description of transmission and reception performed through a wireless channel can refer to the processing being performed as described above by the communication module 190.

According to an embodiment, the communication module 190 may further include a backhaul communicator, and the backhaul communicator may provide an interface for performing communication with other nodes in the network. For example, the backhaul communicator may convert a bit string transmitted from the base station 101 to another node (e.g., another access node, another base station 102, an upper node, a core network, and the like) into a physical signal, and convert the physical signal received from another node into a bit string.

According to an embodiment, the memory 130 may store data such as a basic program, an application program, and setting information for the operation of the base station 101. The memory 130 may be configured as a volatile memory, a non-volatile memory, or a combination of a volatile memory and a non-volatile memory. The memory 130 may provide stored data according to a request of the processor 120. According to an embodiment, the memory 130 may store, as software, a program for determining a degree of influence of inter-modulation distortion (IMD) or harmonic interference (HI) of the user terminal 200 based on uplink information and downlink information of the user terminal 200, and adaptively applying an interference avoidance algorithm to the user terminal 200.

According to an embodiment, the processor 120 may control the overall operation of the base station 101. For example, the processor 120 may transmit and receive signals through the communication module 190 or the backhaul communicator, record data to the memory 130, and read the data (e.g., computer-executable instructions) recorded in the memory 130. The processor 120 may perform functions of a protocol stack required by a communication standard. According to an example embodiment, the protocol stack may be included in the communication module 190.

According to an embodiment, the processor 120 may determine a degree of influence of IMD or HI of the user terminal 200 based on uplink information and downlink information of the user terminal 200, and adaptively apply an interference avoidance algorithm to the user terminal 200. Hereinafter, detailed operations of the processor 120 according to an embodiment are described with reference to FIGS. 2 to 11.

Figure 2:
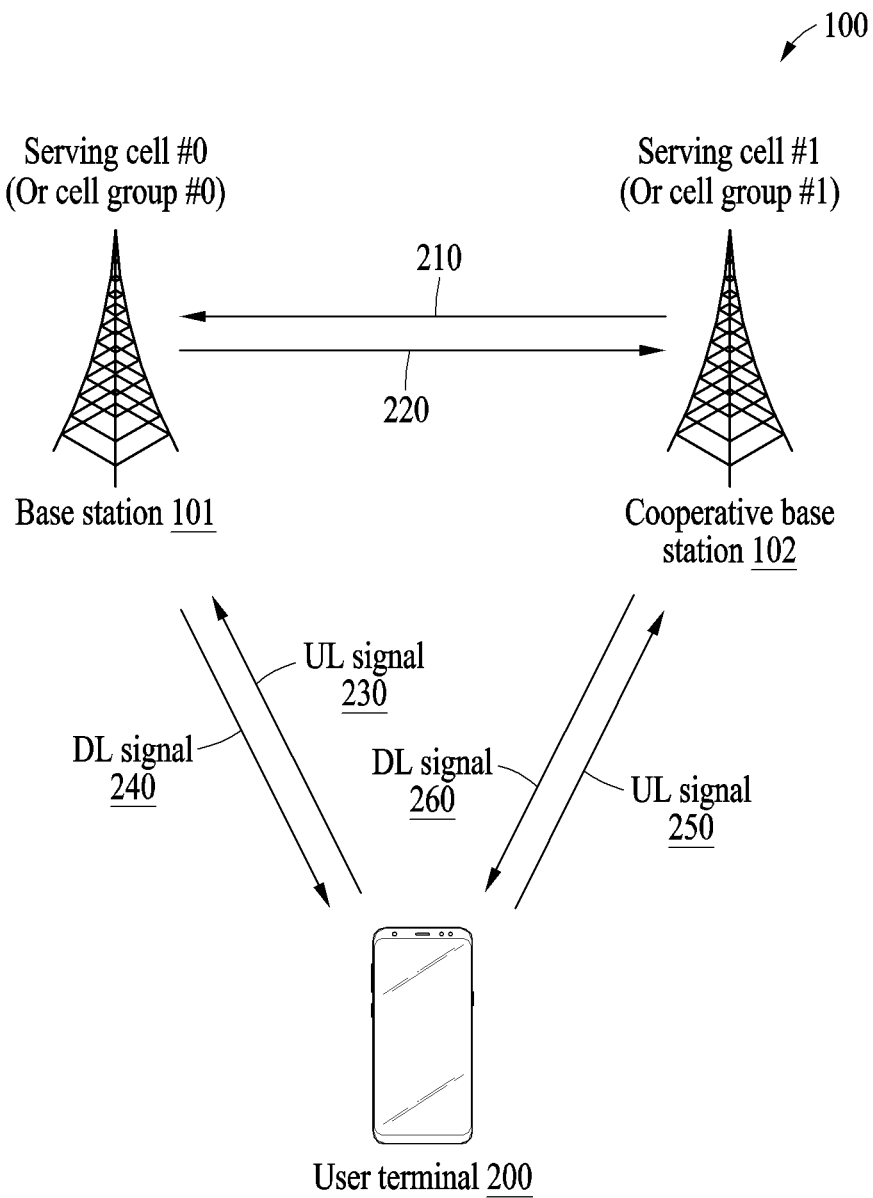
FIG. 2 is a diagram illustrating an example wireless communication system in which a user terminal communicates with a low frequency base station and a high frequency base station, according to various embodiments.

FIG. 2 is a diagram illustrating an example wireless communication system 100 in which a user terminal 200 communicates with a low frequency base station 101 and a high frequency base station 102, according to various embodiments.

The wireless communication system 100 illustrated in FIG. 2 supports CA technology (carrier aggregation technology) or DC/MC technology (dual/multi-connectivity technology) using a plurality of frequency resources at the same time.

The CA technology is used, for example, for increasing frequency use efficiency from the viewpoint of the user terminal 200 or the base stations 101 and 102, wherein a plurality of component carriers are combined, and one terminal 200 transmits and receives signals using the plurality of component carriers at the same time. Specifically, according to the CA technology, the terminal 200 and the base stations 101 and 102 may transmit and receive wideband signals using a plurality of component carriers in the uplink (hereinafter, UL) and the downlink (hereinafter, DL), respectively, and in this case, each component carrier may be in a different frequency band. Hereinafter, the UL refers to, for example, communication links 230 and 250 through which the user terminal 200 transmits signals to the base stations 101 and 102, and the DL refers to, for example, communication links 240 and 260 through which the base stations 101 and 102 transmit signals to the user terminal 200. Here, the number of UL component carriers and the number of DL component carriers may be different and the disclosure is not limited in this respect.

The DC/MC technology is used, for example, for increasing frequency use efficiency from the viewpoint of the user terminal 200 or the base stations 101 and 102, wherein one terminal 200 is connected to a plurality of different base stations 101 and 102, and transmits and receives signals by simultaneously using frequency resources within each of the plurality of base stations 101 and 102 located in different frequency bands. The terminal 200 may be simultaneously connected to the base station 101 and the cooperative base station 102, and in this case, the frequency resources used by each of the base stations 101 and 102 may be in different bands.

For example, in FIG. 2, the base station 101 may be a base station that provides a service using LTE technology or 4G mobile communication technology, and may communicate with the user terminal 200 in a first frequency band. The cooperative base station 102 may be a base station that provides a service using NR technology or 5G mobile communication technology, and may communicate with the user terminal 200 in a second frequency band. The first frequency band may be a low frequency band, and the second frequency band may be a high frequency band, and these band may be different from each other.

According to an embodiment, the terminal 200 may perform radio resource control (RRC) access through the base station 101, be served with functions (e.g., connection management, mobility management, and the like) provided by the control plane, and be provided with additional radio resources for transmitting and receiving data through the cooperative base station 102. In descriptions of such dual connectivity technology, dual connectivity in which the base station 101 uses an LTE communication system and the cooperative base station 102 uses an NR communication system may, for example, be referred to as evolved universal terrestrial radio access (E-UTRA)—NR dual connectivity (EN-DC).

However, the communication system 100 to which the operation of the processor 120 is applied is not limited to EN-DC, and all of the detailed operations of the processor 120 to be described below may be applied to various types of multiple connection system including, but not limited to, a communication system (NR—E-UTRA dual connectivity (NE-DC)) in which the base station 101 uses NR technology and the cooperative base station 102 uses LTE technology, a communication system in which the base station 101 and the cooperative base station 102 use LTE technology, and a communication system in which the base station 101 and the cooperative base station 102 use NR technology.

In the CA technology and DC/MC technology, when one terminal 200 transmits and receives signals by simultaneously using a plurality of frequency resources located in different frequency bands, depending on the frequency band combination and the hardware and implementation characteristics of the terminal 200, internal interference signals such as an IMD and HI signal may be generated at a reception end of a particular frequency band, thereby deteriorating the terminal reception performance Hereinafter, for convenience, the description is based on a system to which a dual connectivity (DC) technology is applied, but is not limited thereto, and the present disclosure may also apply, for example, to a system to which a carrier aggregation technology and a multiple connectivity technology are applied.

Referring to FIG. 2, IMD or HI may occur in the system 100 including the terminal 200 that transmits and receives signals by simultaneously using a plurality of base stations 101 and 102 supporting one or more serving cells or cell groups and a plurality of frequency resources located in different frequency bands supported by the plurality of base stations. The plurality of base stations 101 and 102 may support serving cells or cell groups of different frequency bands.

Hereinafter, an example is described based on an assumption that a low frequency base station 101 (e.g., an LTE base station) among the plurality of base stations 101 and 102 may be operated based on frequency division duplexing (FDD), and a high frequency base station 102 (e.g., an NR base station) may be operated based on time division duplexing (TDD), but the disclosure is not limited in this respect. In addition, an example of an EN-DC system is described in which the base station 101 uses an LTE communication system and the cooperative base station 102 uses an NR communication system, but the disclosure is not limited in this respect, and the operation of the processor 120 is described. The description of the operation of the processor 120 may be applied to an arbitrary system including a base station and a terminal operating different frequency bands. In this case, a base station using a low first frequency band among different frequency bands may correspond to the base station 101, and a base station using a high second frequency band may correspond to the cooperative base station 102, and it may be understood that the LTE communication system and NR communication system described as part of the example EN-DC system described below may be replaced by an arbitrary communication system operated by the base station 101 using the low first frequency band and an arbitrary communication system operated by the cooperative base station 102 using the high second frequency band, respectively. The following description of the operation of the processor 120 is not limited to a situation in which the base station 101 and the cooperative base station 102 are implemented as separate base stations, and cell groups of a plurality of different frequency bands may be operated by one base station.

According to an embodiment, in the system 100 in which signals are transmitted and received between the plurality of base stations 101 and 102 and the terminal 200 in different frequency bands at the same time, the reception performance of the DL signals 240 and 260 (IMD victims) in a frequency band received from the base station 101 may deteriorate due to the UL signals 230 and 250 (IMD aggressors) in different frequency bands.

According to an embodiment, in the system 100 in which signals are transmitted and received between the plurality of base stations 101 and 102 and the terminal 200 in different frequency bands at the same time, the reception performance of the DL signal 260 (HI victim) in a high frequency band may deteriorate due to a harmonic component of the UL signal 230 (HI aggressor) in a low frequency band.

Figure 3:
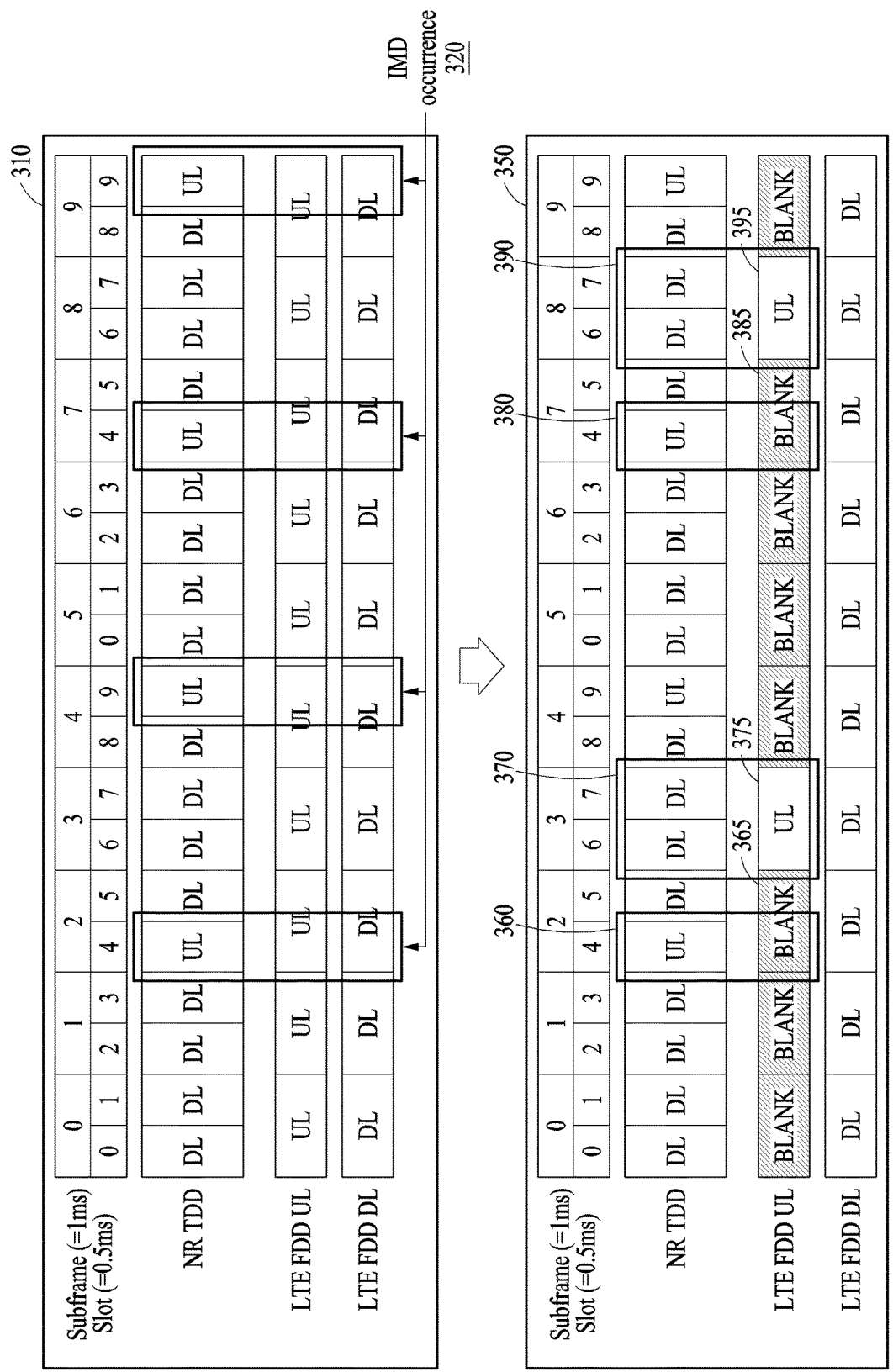
FIG. 3 is a diagram illustrating an example of resource management for IMD avoidance.
Figure 4:
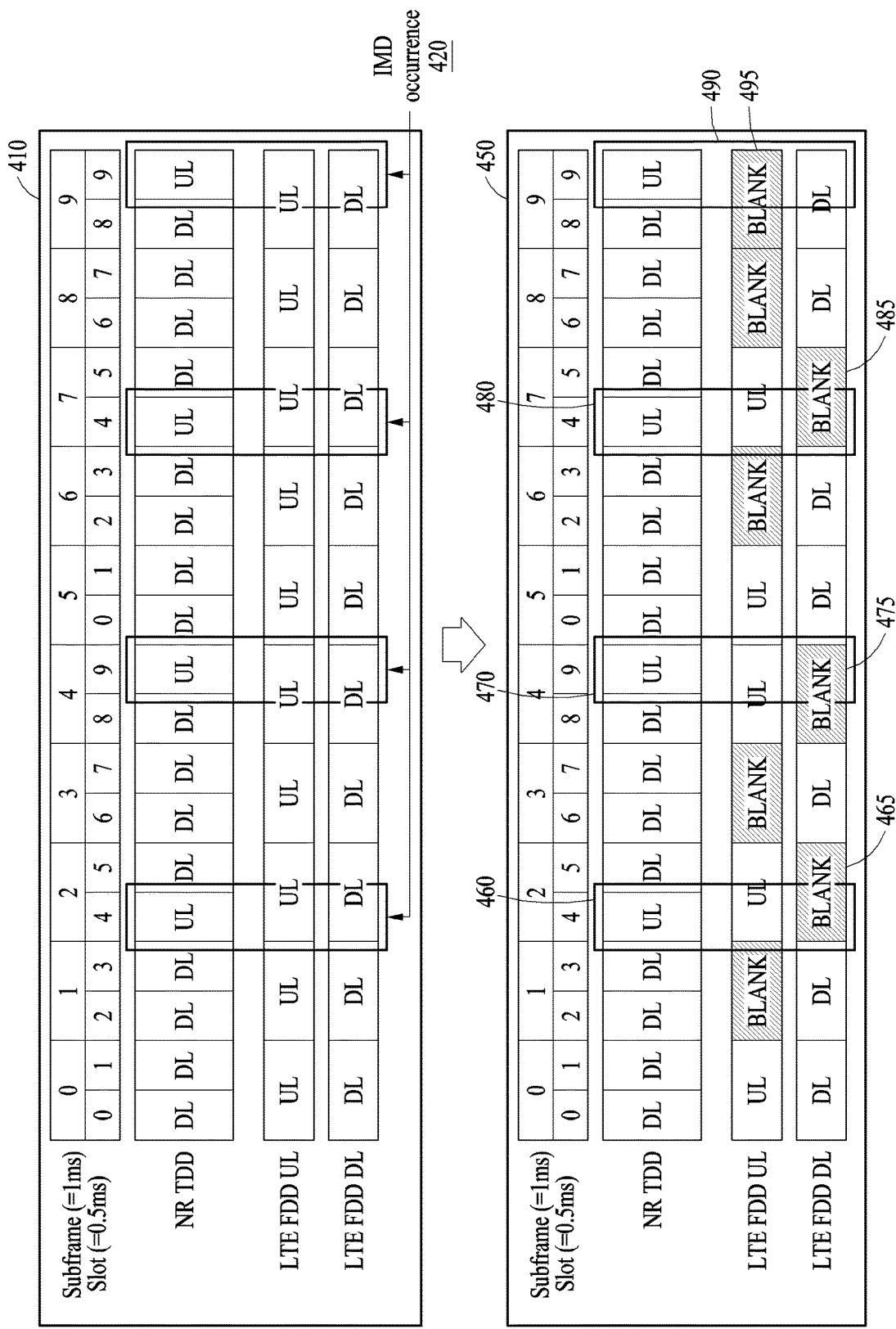
FIG. 4 is a diagram illustrating an example of resource management for IMD avoidance.
Figure 5:
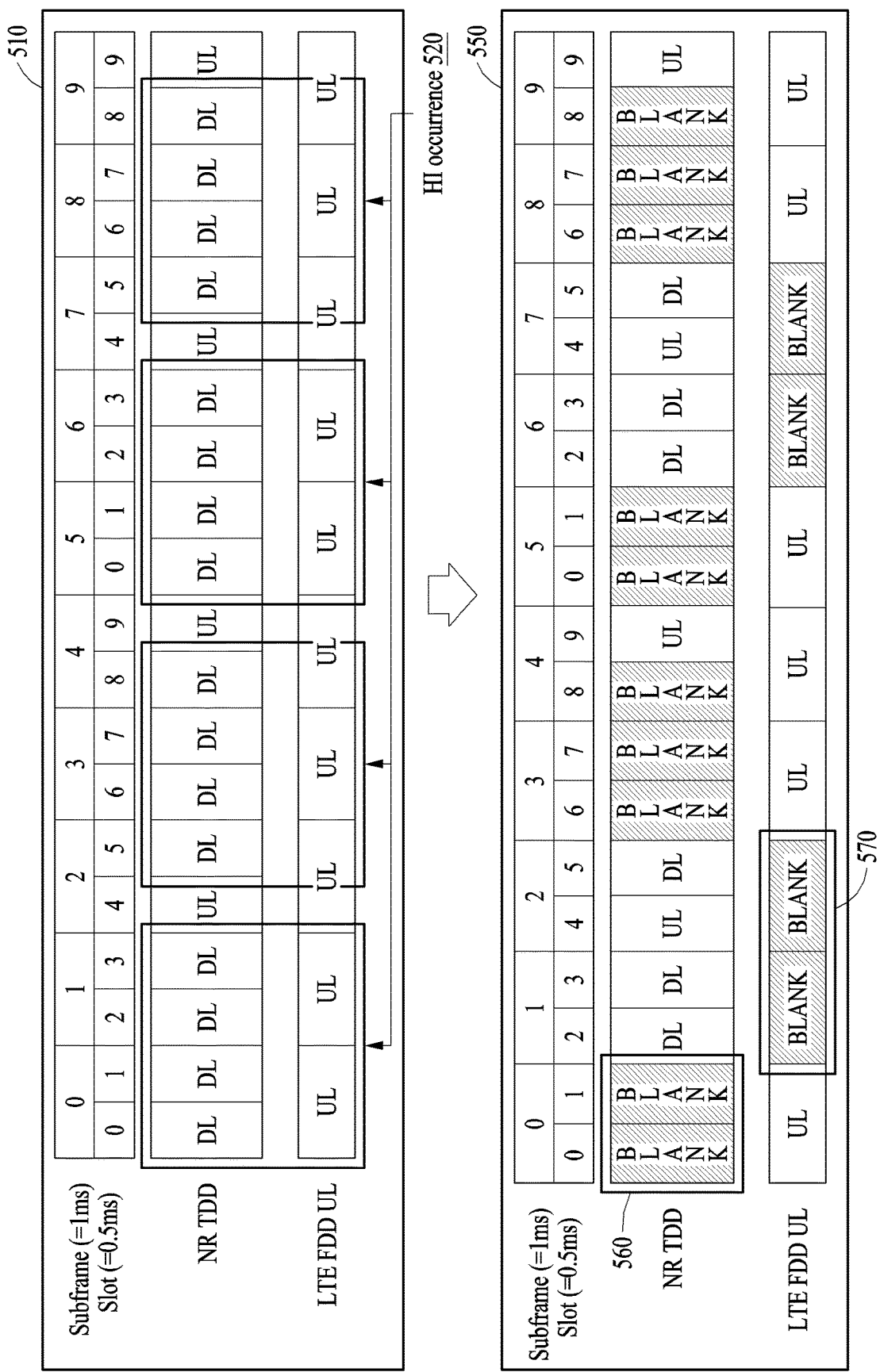
FIG. 5 is a diagram illustrating an example of resource management for HI avoidance.
Figure 6:
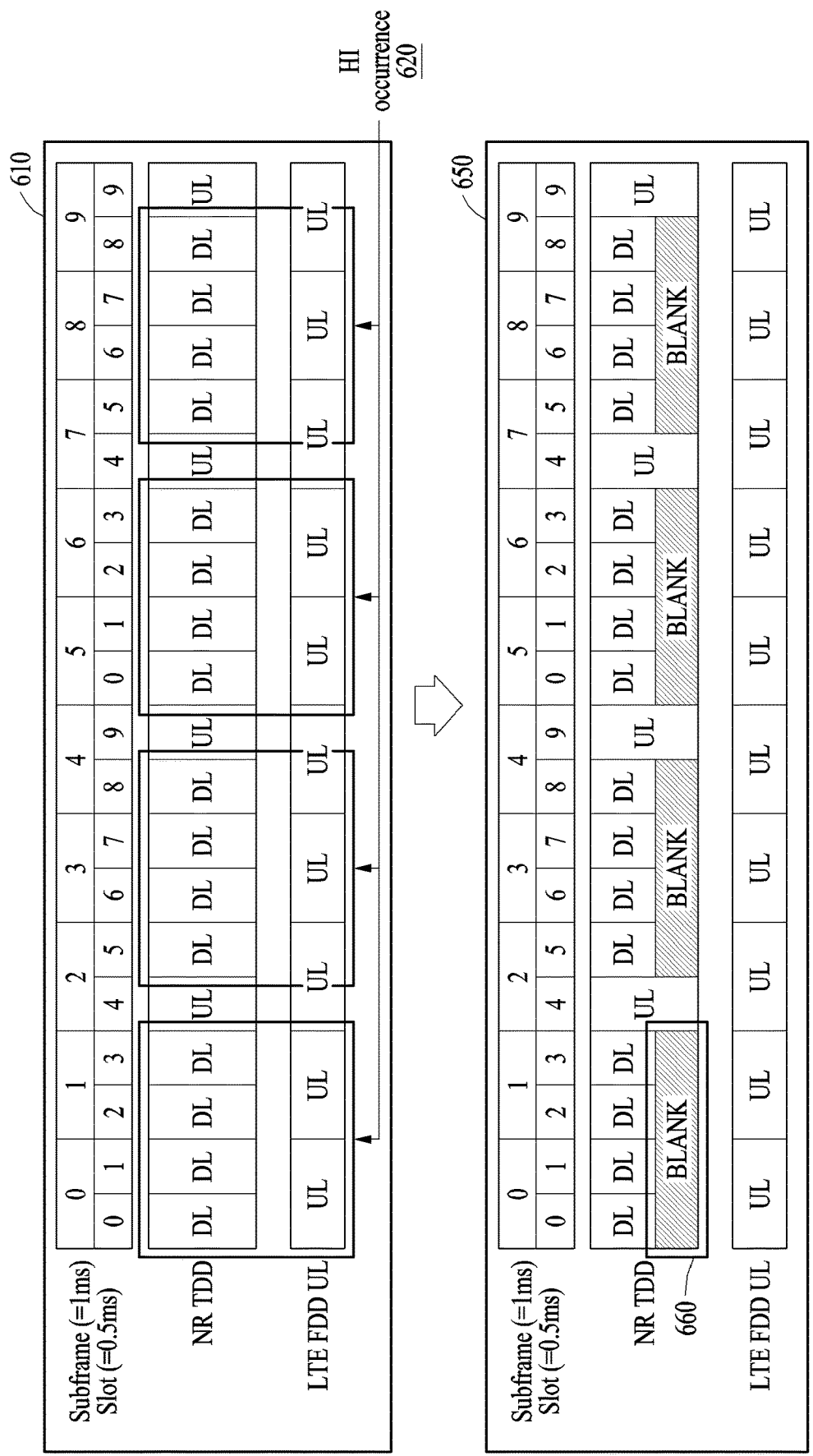
FIG. 6 is a diagram illustrating an example of resource management for HI avoidance.

Various methods to avoid IMD and HI are being studied. With reference to FIGS. 3 and 4, conventional interference avoidance algorithm for removing or mitigating IMD will be described in detail. With reference to FIGS. 5 and 6, conventional interference avoidance algorithm for removing or mitigating HI will be described in detail.

When an existing interference avoidance algorithm, to be described below with reference to FIGS. 3, 4, 5, and 6, is applied, resources that can be used in a time axis and/or a frequency axis may be limited. Specifically, when conventional IMD or HI avoidance algorithm is applied to a CA combination (e.g., an EN-DC, NE-DC, NR-NR, NR-DC) of the user terminal 200, available resources of the user terminal 200 may be limited, and the base stations 101 and 102 may not be able to utilize all available resources.

With respect to IMD and HI, the influence of interference on the terminal may be different according to the strength of the aggressor and the interference sensitivity of the victim. For example, when the user terminal 200 is a strong electric field terminal, the transmission power of the ULs 230 and 250 of the terminal may not be strong, and the reception performance of the DLs 240 and 260 may be good, such that the influence of IMD and HI may not be great. When the user terminal 200 is a weak electric field terminal, the transmission power of the ULs 230 and 250 of the terminal may be close to the maximum, and the reception performance of the DLs 240 and 260 may not be good, such that the influence of IMD and HI may be great.

The processor 120 of the base station 101 may adaptively apply an existing IMD or HI avoidance algorithm to the user terminal 200 only when the influence of IMD or HI is high, based on information on the ULs 230 and 250 and information on the DLs 240 and 260 of the user terminal 200. The following description is based on the assumption that the processor 120 of the base station 101 described with reference to FIG. 1 is being used, but is not limited thereto, and in an example in which the cooperative base station 102 or MC technology is applied, a processor included in other base stations (not shown) may perform the corresponding operation.

According to an embodiment, the processor 120 may receive information on the ULs 230 and 250 and information on the DLs 240 and 260 related to the user terminal 200 from the user terminal 200 and the cooperative base station 102.

As described above, the base station 101 may communicate with the user terminal 200 in the first frequency band that is a low frequency band, and the cooperative base station 102 may communicate with the user terminal 200 in the second frequency band that is a high frequency band. The processor 120 may receive information on the UL 230 and information on the DL 240 in the first frequency band from the user terminal 200, and receive information on the UL 250 and information on the DL 260 in the second frequency band from the cooperative base station 102. According to an embodiment, when the processor of the cooperative base station 102 performs an operation, the processor may receive the information on the UL 250 and the information on the DL 260 in the second frequency band from the user terminal 200, and receive the information on the UL 230 and information on the DL 240 in the first frequency band from the base station 101.

According to an embodiment, the UL information may include at least one of reception signal-to-interference plus noise ratio (SINR) information of physical uplink shared channel (PUSCH) information, modulation coding scheme (MCS) information, power head room (PHR) information, total full Tx power information, total BO Tx power information, or block error rate (BLER) information. According to an embodiment, the UL information received by the processor 120 of the base station 101 may vary according to a structure of the wireless communication system 100.

According to an embodiment, the DL information may include at least one of channel quality indicator (CQI) information, MCS information, rank indicator (RI) information, reference signals received power (RSRP) information, or measurement report (MR) information. According to an embodiment, the DL information received by the processor 120 of the base station 101 may vary according to a structure of the wireless communication system 100.

According to an embodiment, the wireless communication system 100 may have a centralized architecture in which the base station 101 and the cooperative base station 102 can integrally share UL and DL scheduling information, control channel information, terminal electric field information, and the like. For example, the processor 120 of the base station 101 may communicate with the user terminal 200 to receive PUSCH reception SINR information in the first frequency band and receive PUSCH reception SINR information in the second frequency band from the cooperative base station 102, and thereby obtain UL information of the user terminal 200. In addition, the processor 120 may communicate with the user terminal 200 to receive CQI information in the first frequency band and receive CQI information in the second frequency band from the cooperative base station 102, and thereby obtain DL information of the user terminal 200.

According to an embodiment, the wireless communication system 100 may have a distributed architecture in which the base station 101 and the cooperative base station 102 can share information on a limited basis. For example, the processor 120 of the base station 101 may obtain information on the UL 230 and information on the DL 240 in the first frequency band as in the case in which the system 100 has a centralized architecture, but information on the UL 250 and information on the DL 260 in the second frequency band received via link 210 from the cooperative base station 102 may be limited to information defined in the communication standard interface. The communication system 100 may have the above-described centralized architecture or distributed architecture, and the UL information and DL information to be received may vary depending on such architecture.

According to an embodiment, the processor 120 may determine whether the user terminal 200 is a terminal in which IMD or HI may occur, based on a combination of the first frequency band and the second frequency band. For example, the 3GPP standard defines combinations of frequency bands in which IMD or HI can occur, and the processor 120 may determine whether the user terminal 200 is a terminal in which interference may occur based on the defined combination. According to an embodiment, the processor 120 may determine again whether the user terminal 200 is a terminal in which interference may occur whenever the frequency band combination of the user terminal 200 is changed.

According to an embodiment, the operations of the processor 120 of obtaining UL information and DL information related to the user terminal 200, and determining whether IMD or HI may occur in the user terminal 200 may each be implemented as one function module (e.g., including hardware and/or software). For example, the operation may be implemented in an existing module (e.g., a frequency resource allocation module) in the base station 101 or implemented as a separate module.

According to an embodiment, when it is determined that the user terminal 200 is a terminal in which interference may occur, the processor 120 may determine whether to apply an existing interference avoidance algorithm to the user terminal 200 based on the UL information and DL information of the user terminal 200. The processor 120 may determine a UL electric field state based on the UL information and a DL electric field state based on the DL information.

According to an embodiment, when the user terminal 200 satisfies a condition for not applying an interference avoidance algorithm based on the UL electric field state and DL electric field state, the processor 120 may determine not to apply the interference avoidance algorithm to the user terminal 200. For example, when it is determined ten times consecutively that the UL electric field is strong and the DL electric field is strong, the processor 120 may not apply the interference avoidance algorithm to the user terminal 200.

According to an embodiment, when the user terminal 200 satisfies a condition for applying an interference avoidance algorithm based on the UL electric field state and DL electric field state, the processor 120 may determine to apply the interference avoidance algorithm to the user terminal 200 and apply the existing interference avoidance algorithm to the user terminal 200. For example, when it is determined ten times consecutively that the UL electric field is weak or the DL electric field is weak, the processor 120 may determine to apply the interference avoidance algorithm to the user terminal 200, and apply the existing IMD or HI interference avoidance algorithm to the user terminal 200. The existing IMD and HI avoidance algorithms will be described in detail with reference to the following descriptions of FIGS. 3, 4, 5 and 6.

The operations of determining whether to apply the interference avoidance algorithm based on the UL information and DL information and applying or not applying the interference avoidance algorithm, according to an embodiment, will be described below in detail with reference to the descriptions of FIGS. 9, 10, and 11.

FIG. 3 is a diagram illustrating an example of resource management for IMD avoidance.

In the example illustrated in FIG. 3, a single uplink operation (hereinafter, SUO) algorithm defined in the 3GPP standard is applied in relation to IMD avoidance.

Illustrated example 310 is an example of a frequency resource in which IMD occurs in an EN-DC system. As described with reference to FIG. 2, in the system 100 in which signals are transmitted and received between the plurality of base stations 101 and 102 and the terminal 200 in different frequency bands at the same time, the reception performance of a DL signal (an LTE FDD DL) in a low frequency band received from the base station 101 may deteriorate due to UL signals (an NR TDD UL and an LTE FDD UL in example 310) in different frequency bands. FIG. 3 shows a portion 320 where IMD may occur.

Illustrated example 350 is an example of resource management when the SUO algorithm defined in the 3GPP standard is applied. The 3GPP Release 15 standard defines an SUO technology as a solution to IMD occurring in an EN-DC system. The SUO technology is used for avoiding IMD in a scheduling control method based on time division multiplexing (TDM).

Specifically, to avoid IMD, a terminal should not transmit an LTE FDD UL signal and an NR TDD UL signal in the same subframe at the same time. According to the SUO technology, the base station may use an uplink-downlink (UL-DL) configuration and an HARQ subframe offset (not shown) applied to the existing LTE TDD system so that the terminal may designate a transmittable subframe for the UL signal in the LTE FDD system.

Referring to example 350 of FIG. 3, the processor 120 may perform LTE FDD UL signal transmission only in a designated subframe, and accordingly, may avoid IMD by not transmitting NR UL and LTE UL signals at the same time. For example, in the examples 360 and 380 in which IMD may occur, the processor 120 may avoid IMD by not performing (365 and 385) an LTE FDD UL transmission. The processor 120 may instead, transmit (375 and 395) the LTE FDD UL only when it does not overlap with the NR TDD UL as shown in the illustrations of examples 370 and 390.

In the case of the SUO-based IMD avoidance algorithm in example 350 shown in FIG. 3, since the processor 120 does not transmit a UL signal in other subframes (e.g., 365 and 385) other than the designated LTE FDD UL subframes 375 and 395, the efficiency of resource utilization may be reduced.

FIG. 4 is a diagram illustrating an example of resource management for IMD avoidance.

In the example illustrated in FIG. 4, an algorithm different from the SUO algorithm described with reference to FIG. 3 is applied in relation to IMD avoidance.

Illustrated example 410 is an example of a frequency resource in which IMD occurs in an EN-DC system, and the illustration shows a portion 420 where IMD may occur. The descriptions related to the examples 410 and 420 overlap with those related to examples 310 and 320 of FIG. 3, and thus a detailed description of examples 410 and 420 is omitted.

FIG. 4 illustrates a method of setting a portion of a UL or DL subframe as a blank subframe in an LTE FDD system. Referring to FIG. 4, the processor 120 of the base station 101 may selectively set subframes 465, 475, 485, and 495 that overlap 460, 470, 480, and 490 with an NR TDD UL slot among an LTE FDD UL subframe or an LTE FDD DL subframe, as blank subframes. Specifically, a portion 495 of the subframes overlapping with the NR TDD UL slot among the LTE FDD UL subframes may be set as blank subframes, or portions 465, 475, and 485 of the subframes overlapping with the NR TDD UL slot among the LTE FDD DL subframes may be set as blank subframes. The positions of the blank subframes shown in FIG. 4 are only examples and may be set arbitrarily.

According to an embodiment, the processor 120 of the base station 101 may prevent an NR TDD UL transmission and LTE FDD UL transmission from being performed at the same time (blank subframe 495), or prevent an LTE FDD DL reception from being performed (blank subframes 465, 475, and 485) in a subframe in which an NR TDD UL transmission and LTE FDD UL transmission are performed at the same time, to prevent deterioration of LTE FDD DL reception performance due to IMD.

In the method shown in FIG. 4, since the terminal 200 does not use the portions 465, 475, 485, and 495 of the LTE DL subframe and the LTE UL subframe, the efficiency of resource utilization may be reduced.

FIG. 5 is a diagram illustrating an example of resource management for HI avoidance.

In the example illustrated in FIG. 5, an algorithm for avoiding interference in the time axis is applied in relation to HI avoidance.

Example 510 illustrates an example of a frequency resource in which HI occurs. As described with reference to FIG. 2, in the system 100 in which signals are transmitted and received between the plurality of base stations 101 and 102 and the terminal 200 in different frequency bands at the same time, the reception performance of a DL signal (an NR TDD DL of example 510) in a high frequency band received from the base station 101 may deteriorate due to a harmonic component of a UL signal (an LTE FDD UL of example 510) in a low frequency band. FIG. 5 shows a portion 520 where HI may occur.

Referring to example 550 of FIG. 5, the processor 120 may avoid HI by transmitting an LTE FDD UL signal only in a designated subframe or receiving an NR TDD DL signal only in a designated slot so that the time axis does not overlap. For example, the processor 120 may avoid HI by not performing an NR TDD DL reception 560 in a slot overlapping with the LTE FDD UL. The processor 120 may avoid HI by not performing a UL transmission of LTE FDD 570 in a subframe overlapping with the NR TDD DL.

In the case of the HI avoidance algorithm in example 550 shown in FIG. 5, since the processor 120 does not transmit a UL signal or receive a DL signal in other subframes (e.g., 560 and 570) other than the designated LTE FDD UL subframe or the NR TDD DL slot, the efficiency of resource utilization may be reduced.

FIG. 6 is a diagram illustrating an example of resource management for HI avoidance.

In the example illustrated in FIG. 6, an algorithm for avoiding interference in the frequency axis is applied in relation to HI avoidance.

Illustrated example 610 is an example of a frequency resource in which HI occurs, and the illustration shows a portion 620 where HI may occur. The descriptions related to the examples 610 and 620 overlap with those related to examples 510 and 520 of FIG. 5, and thus a detailed description of examples 610 and 620 thereof is not repeated.

Referring to example 650 of FIG. 6, the processor 120 may avoid HI by receiving an NR TDD DL signal so that the frequency axis does not overlap. For example, the processor 120 may avoid HI by excluding 660 a resource affected by interference in an NR TDD DL frequency that is a victim in a slot overlapping with an LTE FDD UL and the time axis.

In the case of an HI avoidance algorithm shown in example 650 of FIG. 6, since the processor 120 does not use the excluded frequency resource (e.g., 660), the efficiency of resource utilization may be reduced.

Figure 7:
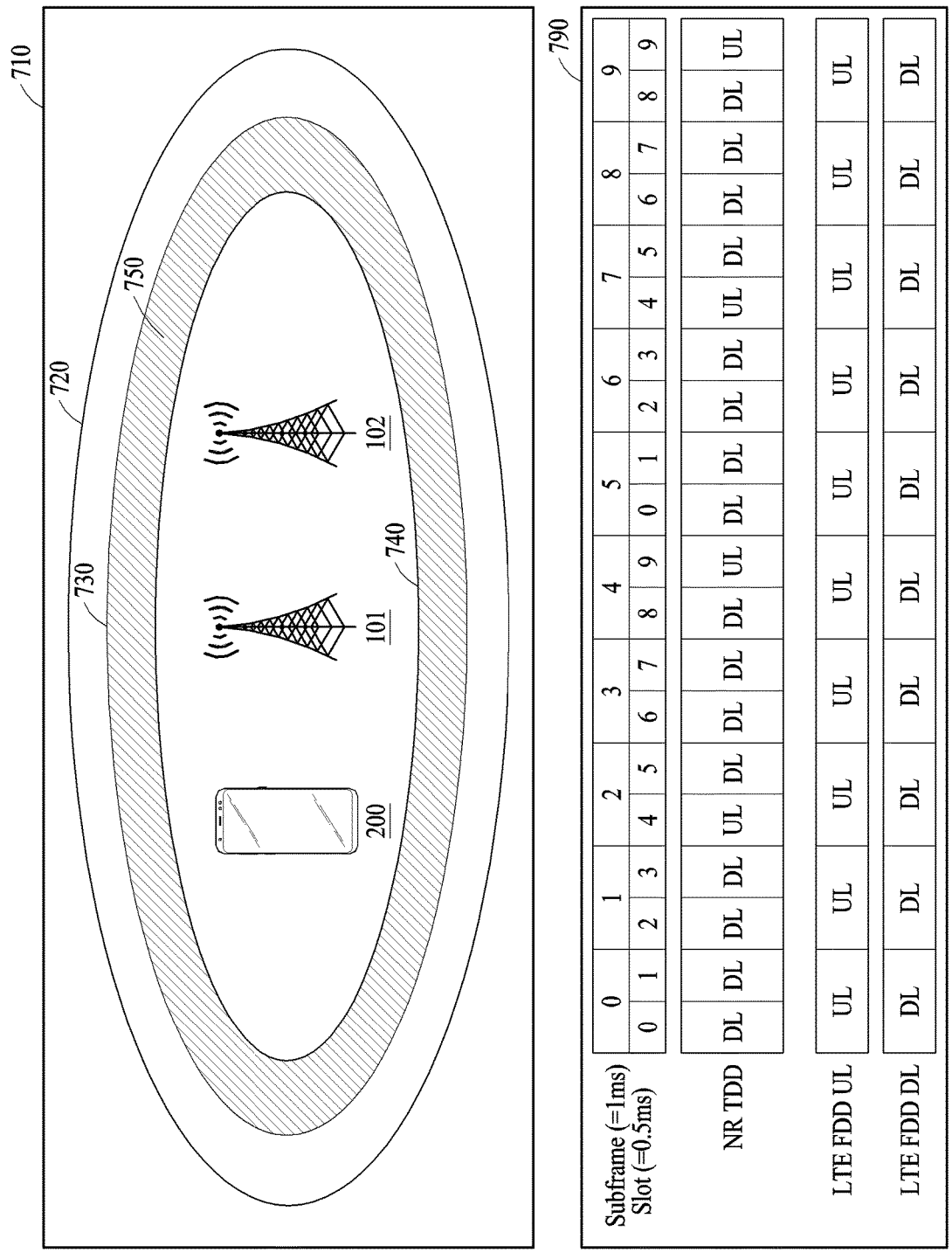
FIG. 7 is a diagram illustrating an example wireless communication system when an interference avoidance algorithm is adaptively applied.

FIG. 7 is a diagram illustrating an example wireless communication system when an interference avoidance algorithm is adaptively applied.

Referring to FIG. 7, the illustration of example 710 shows a wireless communication system 100 in which whether an interference avoidance algorithm is applied depends on a regional range when the processor 120 of the base station 101 adaptively applies the interference avoidance algorithm to the user terminal 200.

According to an embodiment, as described with reference to FIG. 2, in the system 100 including the base station 101 using a low frequency, the cooperative base station 102 using a high frequency, and the terminal 200 that transmits and receives signals simultaneously using a plurality of frequency resources in different frequency bands supported by the base stations 101 and 102, a low frequency coverage area (an area within example 720) and a high frequency coverage area (an area within 730 of FIG. 7) exist. In the case of high frequencies, the high frequency coverage area may be smaller than the low frequency coverage area because speed is fast and strength in a direct line is high, but reach is short.

As described above with reference to FIG. 2, the processor 120 of the base station 101 may receive the UL information and DL information in the low frequency band and the UL information and the DL information in the high frequency band of the user terminal 200, and may determine whether the user terminal 200 is a terminal in which IMD or HI may occur based on the combination of a low frequency band and a high frequency band.

According to an embodiment, when the user terminal 200 is a terminal in which interference may occur, the processor 120 may determine whether to apply an interference avoidance algorithm to the user terminal 200 based on the UL information and DL information of the user terminal 200. As described above with reference to FIG. 2, the processor 120 may determine the UL electric field state based on the UL information, determine the DL electric field state based on the DL information, and based on the determination, may determine not to apply the existing interference avoidance algorithm. Specifically, when the UL electric field of the user terminal 200 is strong and the DL electric field is also strong, the processor 120 may determine that a degree of influence of IMD or HI is small, and may not apply the avoidance algorithm described above with reference to FIGS. 3, 4, 5, and 6.

According to an embodiment, the closer the user terminal 200 is to the base stations 101 and 102, the stronger the electric field, and the processor 120 may not apply the interference avoidance algorithm to the user terminal 200. For example, the interference avoidance algorithm may not be applied in a predetermined area (e.g., an area within 740 of FIG. 7) based on the base stations 101 and 102.

According to an embodiment, the processor 120 may not apply the existing interference avoidance algorithm to an area within 740 of FIG. 7, and may apply the existing interference avoidance algorithm only to an area 750 in which the degree of influence of the interference is high in the high frequency coverage area (an area within 730 of FIG. 7) in which the low frequency coverage area and the high frequency coverage area overlap. According to an embodiment, in an area (an area outside 730 of FIG. 7) outside the high frequency coverage area, interference due to communication in the high frequency band and the low frequency band may not occur.

When the interference avoidance algorithm is not applied because the degree of influence of the interference is low, the processor 120 may utilize all available resources for the user terminal 200. For example, the processor 120 may reduce resource waste (BLANK of 350, 450, 550, and 650) due to the existing interference avoidance algorithm described above with reference to FIGS. 3, 4, 5, and 6, and may provide service to the user terminal 200 by utilizing all available resources as indicated in example 790.

A method of determining the degree of influence of interference of the processor 120 of the base station 101 according to an embodiment will be described below in detail with reference to FIGS. 9, 10, and 11.

<Operating Method of Base Station>

Figure 8:
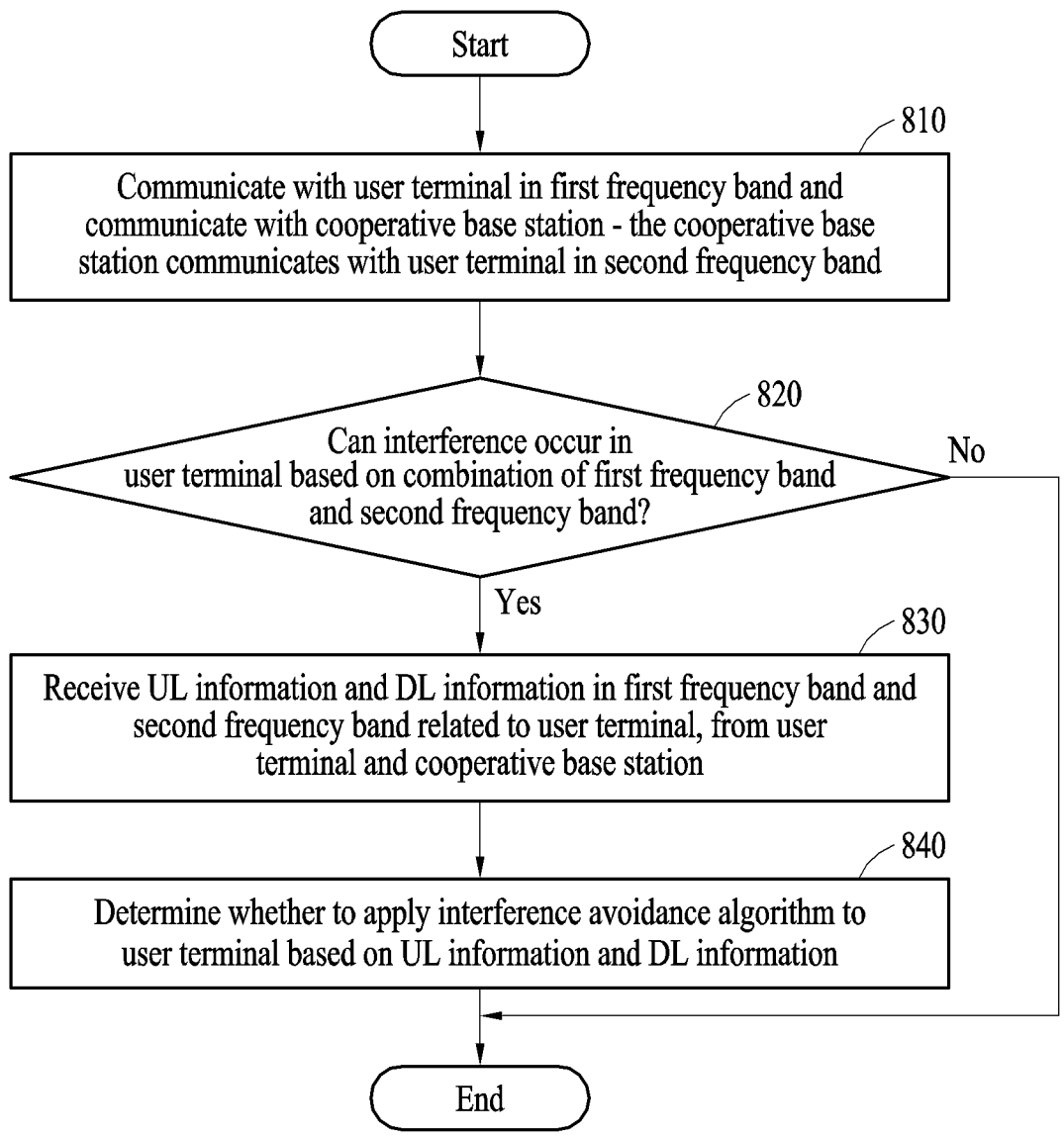
FIG. 8 is a flowchart illustrating an example operation of a base station according to various embodiments.

FIG. 8 is a flowchart illustrating an example operation of a base station according to various embodiments.

Operations 810, 820, 830, and 840 may be performed by the processor 120 of the base station 101 described above with reference to FIG. 1, and accordingly, the description provided that refers to FIGS. 1 to 7 will not be repeated for conciseness.

According to an embodiment, in operation 810, the processor 120 of the base station 101 may communicate with the user terminal 200 in a first frequency band and communicate with the cooperative base station 102. The cooperative base station 102 may communicate with the user terminal 200 in a second frequency band. The base station 101 may be an LTE base station communicating in a low frequency band, and the cooperative base station may be an NR base station communicating in a high frequency band, but is not limited thereto as described above with reference to FIG. 2.

According to an embodiment, in operation 820, the processor 120 may determine whether IMD or HI may occur in the user terminal 200, based on a combination of the first frequency band and the second frequency band. For example, as described with reference to FIG. 2, a combination of frequency bands in which IMD or HI may occur is defined in the 3GPP standard, and the processor 120 may determine whether the user terminal 200 is a terminal in which interference may occur by referring to the 3GPP standard. Specifically, in operation 820, the processor 120 may determine whether the user terminal 200 is a terminal in which IMD may occur, or a terminal in which HI may occur. According to an embodiment, the processor 120 may determine again whether the user terminal 200 is a terminal in which interference may occur when the combination of the frequency bands in which the user terminal 200 communicates is changed.

According to an embodiment, when the user terminal 200 is a terminal in which IMD or HI may occur, in operation 830, the processor 120 may receive UL information and DL information in the first frequency band and the second frequency band related to the user terminal 200, from the user terminal 200 and the cooperative base station 102. When the wireless communication system 100 to which the base station 101 and the cooperative base station 102 belong has a distributed architecture, as described above with reference to FIG. 2, the UL information and DL information in the second frequency band that the processor 120 receives from the cooperative base station 102 may be limited. According to an embodiment, the type and amount of the UL information and DL information of the user terminal 200 received by the processor 120 may vary according to the wireless communication system 100.

According to an embodiment, in operation 840, the processor 120 may determine whether to apply an interference avoidance algorithm to the user terminal 200 based on UL information and DL information in a low frequency band and a high frequency band of the user terminal 200. According to an embodiment, the processor 120 may repeat operations 830 and 840 periodically or aperiodically.

An embodiment in which the processor 120 may determine whether to apply the interference avoidance algorithm to the user terminal 200 based on the UL information and DL information in operation 840 is described in detail with reference to FIGS. 9, 10, and 11.

Figure 9:
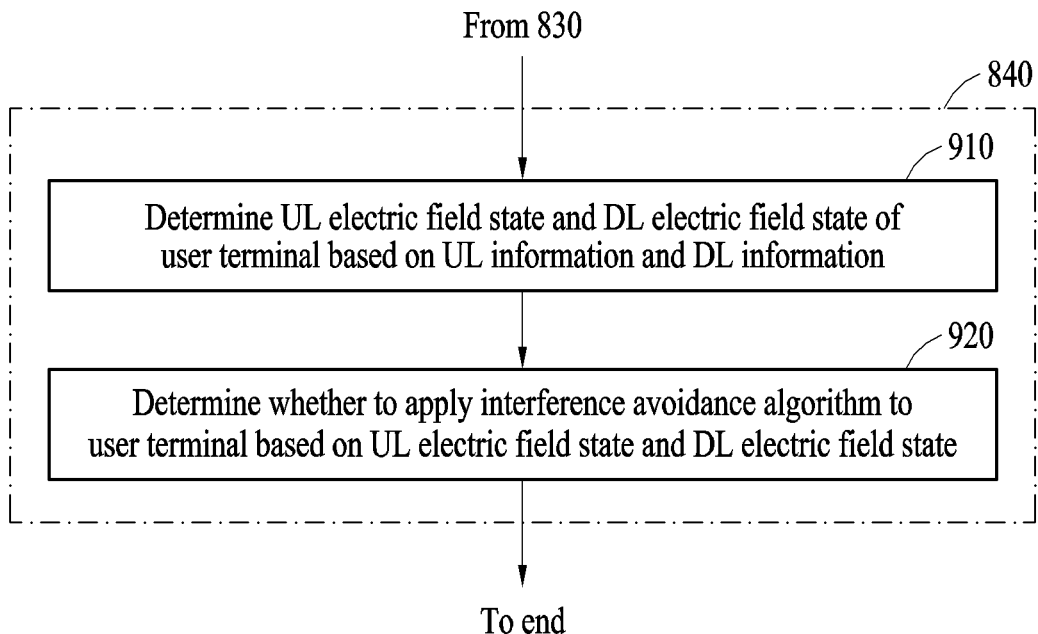
FIG. 9 is a flowchart illustrating an example operation of determining whether to apply an interference avoidance algorithm according to various embodiments.

FIG. 9 is a flowchart illustrating an example operation of determining whether to apply an interference avoidance algorithm according to various embodiments.

Operations 910 and 920 may be performed by the processor 120 of the base station 101 described above with reference to FIG. 1. According to an embodiment, operations 910 and 920 may correspond to the determining (e.g., operation 840 of FIG. 8) of whether to apply an interference avoidance algorithm to the user terminal based on UL information and DL information described with reference to FIG. 8.

Hereinafter, the descriptions provided that refer to FIGS. 1 to 8 are not repeated.

According to an embodiment, in operation 910, the processor 120 may determine an uplink electric field state and a downlink electric field state of the user terminal 200 based on UL information and DL information. The processor 120 may use at least one of reception signal-to-interference plus noise ratio (SINR) information of physical uplink shared channel (PUSCH) information, modulation coding scheme (MCS) information, power head room (PHR) information, total full Tx power information, total BO Tx power information, or block error rate (BLER) information as UL information for determining an uplink electric field state. The processor 120 may use at least one of channel quality indicator (CQI) information, modulation coding rate (MCS) information, rank indicator (RI) information, reference signals received power (RSRP) information, or measurement report (MR) information as DL information for determining a downlink electric field state.

According to an embodiment, in operation 920, the processor 120 may determine whether to apply an interference avoidance algorithm to the user terminal 200 based on the UL electric field state and the DL electric field state. According to an embodiment, when the user terminal 200 satisfies a condition for not applying an interference avoidance algorithm based on the UL electric field state and DL electric field state, the processor 120 may determine not to apply the interference avoidance algorithm to the user terminal 200. According to an embodiment, when the user terminal 200 satisfies a condition for applying an interference avoidance algorithm based on the UL electric field state and DL electric field state, the processor 120 may determine to apply the interference avoidance algorithm to the user terminal 200 and apply the existing interference avoidance algorithm to the user terminal 200. The existing interference avoidance algorithm may be the interference avoidance algorithm described with reference to FIGS. 3, 4, 5, and 6.

According to an embodiment, the processor 120 may perform the operation 910 of determining an electric field state and the operation 920 of determining whether to apply an interference avoidance algorithm based on the electric field state by referring to [Table 1] below.

TABLE 1

| UL info | DL info | Applied and non-applied conditions based on electric field state | Action | Reference value |
|---|---|---|---|---|
| PHR | CQI | ('PHR > TH' and 'CQI > TH') N consecutive times satisfied | applied → not applied | PHR Threshold = 37, CQI Threshold = 10, N times: 10 times (high frequency and low frequency the same) |
| | | ('PHR <= TH' or 'CQI <= TH ) M consecutive times satisfied | not applied → applied | PHR Threshold = 33, CQI Threshold = 6, M times: 10 times (high frequency and low frequency the same) |
| FullTx Power | CQI, MCS | ('FullTxPower < TH' and 'CQI > TH' and 'MCS > TH') N consecutive times satisfied | applied → not applied | (High frequency) FullTxPower Threshold = 18 dBm, CQI Threshold = 10, Downlink MCS Threshold = 17, N times: 10 times (Low frequency) FullTxPower Threshold = 10 dBm, CQI Threshold = 10, Downlink MCS Threshold = 17, M times: 10 times |
| | | ('FullTxPower >= TH' or 'CQI <= TH' or 'MCS <= TH') M consecutive times satisfied | not applied → applied | (High frequency) FullTxPower Threshold = 19 dBm, CQI Threshold = 6, Downlink MCS Threshold = 9, N times: 10 times (Low frequency) FullTxPower Threshold = 12 dBm, CQI Threshold = 6, Downlink MCS Threshold = 9, M times: 10 times |
| PUSCH SINR | CQI | ('PUSCH SINR > TH' and 'CQI > TH') N consecutive times satisfied | applied → not applied | SINR Threshold = 12, CQI Threshold = 10, N times: 500 times (high frequency and low frequency the same) |
| | | ('PUSCH SINR <= TH' or 'CQI <= TH') M consecutive times satisfied | not applied → applied | SINR Threshold = 8, CQI Threshold = 6, M times: 500 times (high frequency and low frequency the same) |
| FullTx Power | CQI | ('FullTxPower < TH' and 'CQI > TH') N consecutive times satisfied | applied → not applied | (High frequency) FullTxPower Threshold = 18 dBm, CQI Threshold = 10, N times: 10 times (Low frequency) FullTxPower Threshold = 10 dBm, CQI Threshold = 10, M times: 10 times |
| | | ('FullTxPower >= TH' or 'CQI <= TH') M consecutive times satisfied | not applied → applied | (High frequency) FullTxPower Threshold = 19 dBm, CQI Threshold = 6, N times: 10 times (Low frequency) FullTxPower Threshold = 12 dBm, CQI Threshold = 6, M times: 10 times |
| MCS | CQI | (MCS > TH and 'CQI > TH') N consecutive times satisfied | applied → not applied | Uplink MCS Threshold = 21, CQI Threshold = 10, N times: 500 (high frequency and low frequency the same) |
| | | (MCS <= TH or 'CQI <= TH) M consecutive times satisfied | not applied → applied | Uplink MCS Threshold = 10, CQI Threshold = 6, M times: 500 times (high frequency and low frequency the same) |
| PUSCH SINR | MCS | ('PUSCH SINR > TH' and MCS > TH') N consecutive times satisfied | applied → not applied | SINR Threshold = 12, Downlink MCS Threshold = 17, N times: 500 times (high frequency and low frequency the same) |
| | | ('PUSCH SINR <= TH' or MCS <= TH') M consecutive times satisfied | not applied → applied | SINR Threshold = 8, navigation link MCS Threshold = 9, M times: 500 times (high frequency and low frequency the same) |
| MCS | MCS | (MCS > TH and MCS > TH') N consecutive times satisfied | applied → not applied | Uplink MCS Threshold = 21, Downlink MCS Threshold = 17, N times: 500 times (high frequency and low frequency the same) |
| | | (MCS <= TH or MCS <= TH') M consecutive times satisfied | not applied → applied | Uplink MCS Threshold = 10, Downlink MCS Threshold = 9, M times: 500 times (high frequency and low frequency the same) |

TABLE 1-continued

| UL info | DL info | Applied and non-applied conditions based on electric field state | Action | Reference value |
|---|---|---|---|---|
| PHR | MCS | ('PHR > TH' and MCS > TH') N consecutive times satisfied | applied → not applied | PHR Threshold = 37, Downlink MCS Threshold = 17, N times: 10 times (high frequency and low frequency the same) |
| | | ('PHR <= TH' or MCS <= TH') M consecutive times satisfied | not applied → applied | PHR Threshold = 33, Downlink MCS Threshold = 9, M times: 10 times (high frequency and low frequency the same) |
| FullTx Power | MCS | ('FullTxPower < TH' and MCS > TH') N consecutive times satisfied | applied → not applied | (High frequency) FullTxPower Threshold = 18 dBm, Uplink MCS Threshold = 17, N times: 10 times (Low frequency) FullTxPower Threshold = 10 dBm, MCS Threshold = 17, M times: 10 times |
| | | ('FullTxPower >= TH' or MCS <= TH') M consecutive times satisfied | not applied → applied | (High frequency) FullTxPower Threshold = 19 dBm, MCS Threshold = 9, N times: 10 times (Low frequency) FullTxPower Threshold = 12 dBm, MCS Threshold = 9, M times: 10 times |
| PUSCH SINR, FullTx Power | CQI, MCS | ('PUSCH SINR > TH' and 'FullTxPower < TH' and 'CQI > TH' and MCS > TH') N consecutive times satisfied | applied → not applied | (High frequency) SINR Threshold = 12, FullTxPower Threshold = 18 dBm, CQI Threshold = 10, Downlink MCS Threshold = 17, N times: 10 times (Low frequency) SINR Threshold = 12, FullTxPower Threshold = 10 dBm, CQI Threshold = 10, Downlink MCS Threshold = 17, M times: 10 times |
| | | ('PUSCH SINR <= TH' or 'FullTxPower >= TH' or 'CQI <= TH' or 'MCS <= TH') M consecutive times satisfied | not applied → applied | (High frequency) SINR Threshold = 8, FullTxPower Threshold = 19 dBm, CQI Threshold = 6, Downlink MCS Threshold = 9, N times: 10 times (Low frequency) SINR Threshold = 8, FullTxPower Threshold = 12 dBm, CQI Threshold = 6, Downlink MCS Threshold = 9, M times: 10 times |
| PUSCH SINR, MCS, FullTx Power | CQI, MCS | ('PUSCH SINR > TH' and MCS > TH' and 'FullTxPower < TH' and 'CQI > TH' and MCS > TH') N consecutive times satisfied | applied → not applied | (High frequency) SINR Threshold = 12, Uplink MCS Threshold = 21, FullTxPower Threshold = 18 dBm, CQI Threshold = 10, Downlink MCS Threshold = 17, N times: 10 times (Low frequency) SINR Threshold = 12, Uplink MCS Threshold = 21, FullTxPower Threshold = 10 dBm, CQI Threshold = 10, Downlink MCS Threshold = 17, M times: 10 times |
| | | ('PUSCH SINR <= TH' or 'FullTxPower >= TH' or 'CQI <= TH' or 'MCS <= TH') M consecutive times satisfied | not applied → applied | (High frequency) SINR Threshold = 8, Uplink MCS Threshold = 10, FullTxPower Threshold = 19 dBm, CQI Threshold = 6, Downlink MCS Threshold = 9, N times: 10 times (Low frequency) SINR Threshold = 8, Uplink MCS Threshold = 10, FullTxPower Threshold = 12 dBm, CQI Threshold = 6, Downlink MCS Threshold = 9, M times: 10 times |
| PUSCH SINR, MCS, FullTx Power | CQI, MCS, RSRP | ('PUSCH SINR > TH' and MCS > TH' and 'FullTxPower < TH' and 'CQI > TH' and MCS > TH' and 'RSRP > TH') N consecutive times satisfied | applied → not applied | (High frequency) SINR Threshold = 12, Uplink MCS Threshold = 21, FullTxPower Threshold = 18 dBm, CQI Threshold = 10, Downlink MCS Threshold = 17, RSRP Threshold = 75 dBm, N times: 10 times (Low frequency) SINR Threshold = 12, Uplink MCS Threshold = 21, FullTxPower Threshold = 10 dBm, CQI Threshold = 10, Downlink MCS Threshold = 17, RSRP Threshold = 75 dBm, M times: 10 times |
| | | ('PUSCH SINR <= TH' or 'MCS <= TH' or 'FullTxPower >= TH' or 'CQI <= TH' or 'MCS <= TH' or 'RSRP <= TH') M consecutive times satisfied | not applied → applied | (High frequency) SINR Threshold = 8, Uplink MCS Threshold = 9, FullTxPower Threshold = 19 dBm, CQI Threshold = 6, Downlink MCS Threshold = 9, RSRP Threshold = 85 dBm, N times: 10 times (Low frequency) SINR Threshold = 8, MCS Threshold = 9, FullTxPower Threshold = 12 dBm, CQI Threshold = 6, Downlink MCS Threshold = 9, RSRP Threshold = 85 dBm, M times: 10 times |

A first example embodiment in which PHR information is used as the UL information and CQI information is used as the DL information in [Table 1] above is described in detail with reference to FIG. 10, and a second example embodiment in which total full Tx power information is used as the UL information and CQI information and MCS information are used as the DL information in [Table 1] above is described in detail with reference to FIG. 11.

Figure 10:
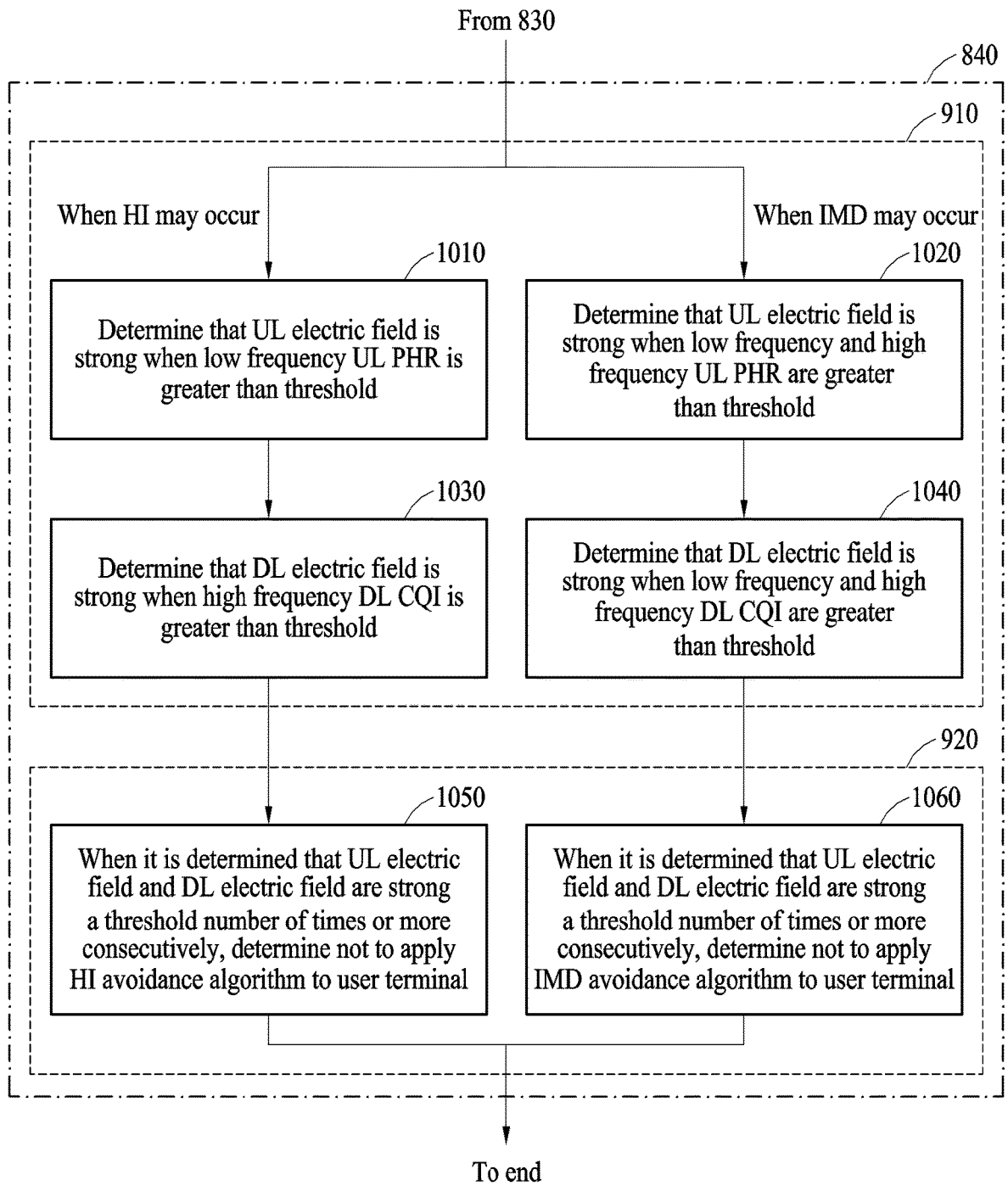
FIG. 10 is a flowchart illustrating an example operation of determining a degree of influence of interference according to various embodiments.

FIG. 10 is a flowchart illustrating an example operation of determining a degree of influence of interference according to various embodiments.

Operations 1010, 1020, 1030, 1040, 1050 and 1060 may be performed by the processor 120 of the base station 101 described above with reference to FIG. 1. According to an embodiment, operations 1010, 1020, 1030, 1040, 1050 and 1060 may correspond to the determining (e.g., operation 840 of FIG. 8) of whether to apply an interference avoidance algorithm to the user terminal based on UL information and DL information described with reference to FIG. 8.

According to an embodiment, operations 1010, 1020, 1030 and 1040 may correspond to the determining (e.g., operation 910 of FIG. 9) of the UL electric field state and the DL electric field state based on the UL information and DL information described with reference to FIG. 9.

According to an embodiment, operations 1050 and 1060 may correspond to the determining (e.g., operation 920 of FIG. 9) of whether to apply the interference avoidance algorithm based on the UL electric field state and the DL electric field state described with reference to FIG. 9.

Hereinafter, an embodiment using PHR information as UL information and CQI information as DL information is described in detail. For conciseness, the units described in [Table 1] may be omitted. Hereinafter, the descriptions provided that refer to FIGS. 1 to 9 are not repeated.

According to an embodiment, since the aggressor and the victim are different in the cases of IMD and HI as described above with reference to FIG. 2, the determination method may also differ. In the determining (e.g., operation 820 of FIG. 8) of whether the user terminal 200 is a terminal in which interference may occur, the processor 120 may determine whether the user terminal 200 is a terminal in which IMD may occur or a terminal in which HI may occur according to a combination defined in the 3GPP standard.

According to an embodiment, when the user terminal 200 is a terminal in which HI may occur, since the aggressor is a low frequency UL, the processor 120 may determine the UL electric field state by using the PHR information among the low frequency UL information in operation 1010. Since the PHR information is information on a remaining power after the power is used for UL transmission against a maximum power of the user terminal 200, the processor 120 may determine that the higher the PHR, the stronger the UL electric field. For example, in operation 1010, when the low frequency UL PHR is greater than "37", the processor 120 may determine that the UL electric field is strong.

According to an embodiment, when the user terminal 200 is a terminal in which HI may occur, since the victim is a high frequency DL, the processor 120 may determine the DL electric field state by using CQI information among the high frequency DL information in operation 1030. For example, in operation 1030, when the high frequency DL CQI is greater than "10", the processor 120 may determine that the DL electric field is strong.

According to an embodiment, in operation 1050, when the processor 120 determines that the UL electric field of the user terminal 200 is strong and the DL electric field of the user terminal 200 is strong for a threshold number of times or more consecutively, the processor 120 may determine not to apply an HI avoidance algorithm to the user terminal 200. For example, when it is determined for ten times or more consecutively that the UL electric field is strong and the DL electric field is strong, the processor 120 may determine not to apply the HI avoidance algorithm to the user terminal 200. According to an embodiment, the HI avoidance algorithm may be the method described with reference to FIGS. 5 and 6, but the disclosure is not limited in this respect.

According to an embodiment, when the user terminal 200 is a terminal in which IMD may occur, since the aggressor is a low frequency or high frequency UL, the processor 120 may determine the UL electric field state by using the PHR information among the low frequency UL information and high frequency UL information in operation 1020. For example, in operation 1020, when the low frequency UL PHR is greater than "37" and the high frequency UL PHR is greater than "37", the processor 120 may determine that the UL electric field is strong.

According to an embodiment, when the user terminal 200 is a terminal in which IMD may occur, since the victim is a low frequency or high frequency DL, the processor 120 may determine the DL electric field state by using the CQI information among the low frequency DL information and high frequency DL information in operation 1040. For example, in operation 1040, when the low frequency DL CQI is greater than "10" and the high frequency DL CQI is greater than "10", the processor 120 may determine that the DL electric field is strong.

According to an embodiment, in operation 1060, when the processor 120 determines that the UL electric field of the user terminal 200 is strong and the DL electric field of the user terminal 200 is strong for a threshold number of times or more consecutively, the processor 120 may determine not to apply IMD avoidance algorithm to the user terminal 200. For example, when it is determined for ten times or more consecutively that the UL electric field is strong and the DL electric field is strong, the processor 120 may determine not to apply the IMD avoidance algorithm to the user terminal 200. According to an embodiment, the IMD avoidance algorithm may be the method described with reference to FIGS. 3 and 4, but the disclosure is not limited in this respect.

An embodiment of a determination not to apply the interference avoidance algorithm using PHR information as the UL information and CQI information as the DL information has been described with reference to FIG. 10, but other embodiments can be described with reference to the above-described [Table 1]. According to an embodiment, the processor 120 may determine to apply an interference avoidance algorithm.

For example, in the case of HI, the processor 120 may determine that the UL electric field is weak when the low frequency UL PHR is less than or equal to "33", and may determine that the DL electric field is weak when the high frequency DL CQI is less than or equal to "6". When it is determined for ten times or more consecutively that the UL electric field is weak and the DL electric field is weak, the processor 120 may determine to apply the HI avoidance algorithm to the user terminal 200.

In the case of IMD, the processor 120 may determine that the UL electric field is weak when the low frequency UL PHR is less than or equal to "33" or the high frequency UL PHR is less than or equal to "33", and may determine that the DL electric field is weak when the low frequency DL CQI is less than or equal to "6" or the high frequency DL CQI is less than or equal to "6". When it is determined for ten times or more consecutively that the UL electric field is weak and the DL electric field is weak, the processor 120 may determine to apply the IMD avoidance algorithm to the user terminal 200.

Figure 11:
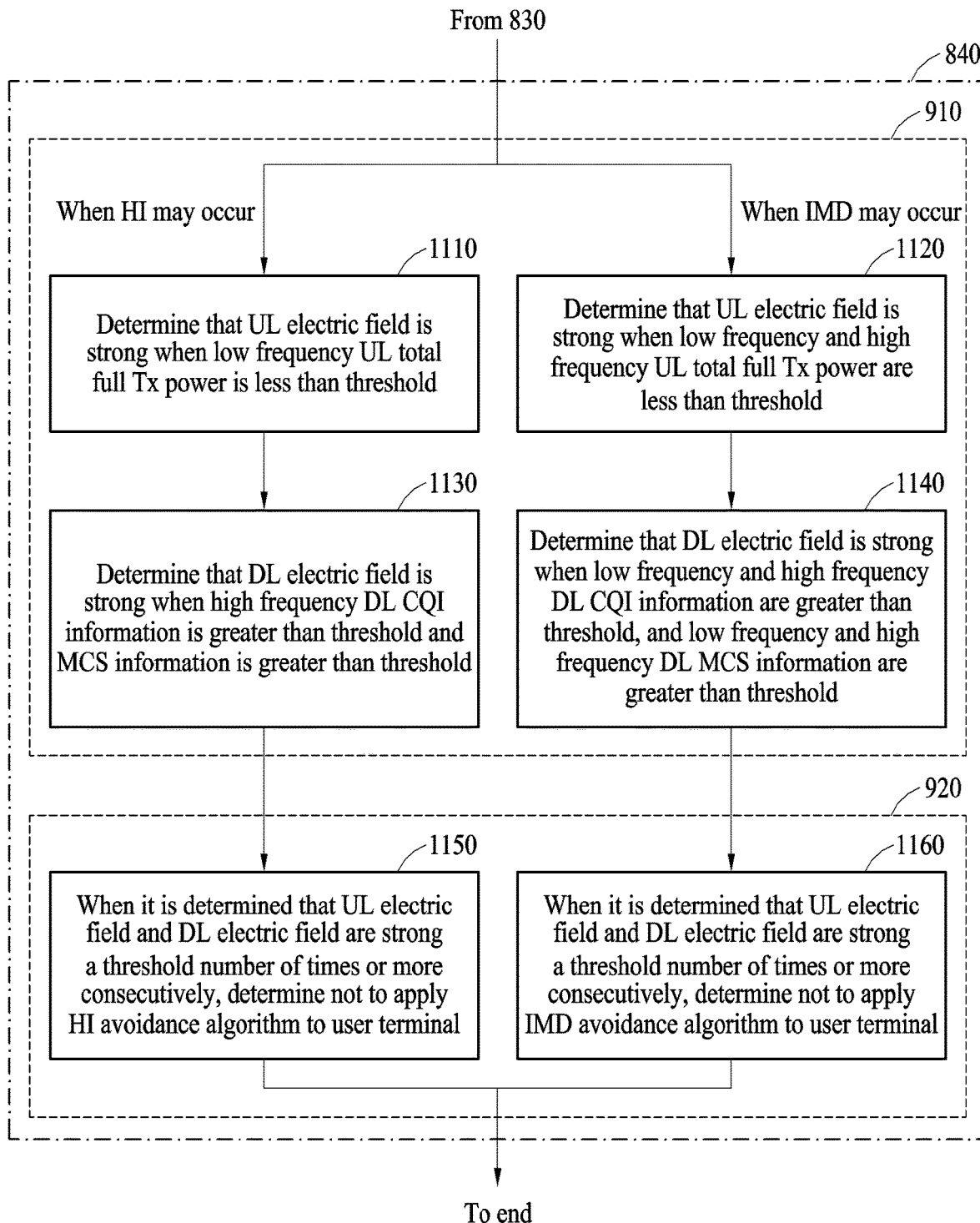
FIG. 11 is a flowchart illustrating an example operation of determining a degree of influence of interference according to various embodiments.

FIG. 11 is a flowchart illustrating an example operation of determining a degree of influence of interference according to various embodiments.

Operations 1110, 1120, 1130, 1140, 1150, and 1160 may be performed by the processor 120 of the base station 101 described above with reference to FIG. 1. According to an embodiment, operations 1110, 1120, 1130, 1140, 1150, and 1160 may correspond to the determining (e.g., operation 840 of FIG. 8) of whether to apply an interference avoidance algorithm to the user terminal based on UL information and DL information described with reference to FIG. 8.

According to an embodiment, operations 1110, 1120, 1130, and 1140 may correspond to the determining (e.g., operation 910 of FIG. 9) of the UL electric field state and the DL electric field state based on the UL information and DL information described with reference to FIG. 9.

According to an embodiment, operations 1150 and 1160 may correspond to the determining (e.g., operation 920 of FIG. 9) of whether to apply the interference avoidance algorithm based on the UL electric field state and the DL electric field state described with reference to FIG. 9.

Hereinafter, an embodiment in which total full Tx power information is used as UL information and CQI information and MCS information are used as DL information is described in detail. For conciseness, the units described in [Table 1] may be omitted. The descriptions provided that refer to FIGS. 1 to 10 are not repeated.

As described above with reference to FIG. 10, the determination method of the processor 120 may be different in the case of IMD and in the case of HI.

According to an embodiment, when the user terminal 200 is a terminal in which HI may occur, since the aggressor is a low frequency UL, the processor 120 may determine the UL electric field state by using the total full Tx power information among the low frequency UL information in operation 1110. According to an embodiment, the total full Tx power may be power needed in radio bearer (RB) transmission of an entire bandwidth while maintaining a power density. The power density per RB may be calculated based on the power used for PUSCH transmission and the number of PUSCH allocated RBs whenever a PHR is received from the user terminal 200. The processor 120 may determine that the electric field of the terminal becomes stronger as the total full Tx power becomes smaller. For example, in operation 1110, when the low frequency UL total full Tx power is less than "10", the processor 120 may determine that the UL electric field is strong.

According to an embodiment, when the user terminal 200 is a terminal in which HI may occur, since the victim is a high frequency DL, the processor 120 may determine the DL electric field state using CQI information and MCS information among the high frequency DL information in operation 1130. For example, in operation 1130, when the high frequency DL CQI is greater than "10" and the MCS is greater than "17", the processor 120 may determine that the DL electric field is strong.

According to an embodiment, in operation 1150, when the processor 120 determines that the UL electric field of the user terminal 200 is strong and the DL electric field of the user terminal 200 is strong for a threshold number of times or more consecutively, the processor 120 may determine not to apply an HI avoidance algorithm to the user terminal 200. For example, when it is determined for ten times or more consecutively that the UL electric field is strong and the DL electric field is strong, the processor 120 may determine not to apply the HI avoidance algorithm to the user terminal 200. According to an embodiment, the HI avoidance algorithm may be the method described with reference to FIGS. 5 and 6, but the disclosure is not limited in this respect.

According to an embodiment, when the user terminal 200 is a terminal in which IMD may occur, since the aggressor is a low frequency or high frequency UL, the processor 120 may determine the UL electric field state using the total full Tx power information among the low frequency UL information and high frequency UL information in operation 1120. For example, in operation 1120, when the low frequency UL total full Tx power is less than "10" and the high frequency UL total full Tx power is less than "18", the processor 120 may determine that the UL electric field is strong.

According to an embodiment, when the user terminal 200 is a terminal in which IMD may occur, since the victim is a low frequency or high frequency DL, the processor 120 may determine the DL electric field state by using the CQI information and MCS information among the low frequency DL information and high frequency DL information in operation 1140. For example, in operation 1140, when the low frequency DL CQI and the high frequency DL CQI are greater than "10", and the low frequency DL MCS and the high frequency DL MCS are greater than "17", the processor 120 may determine that the DL electric field is strong.

According to an embodiment, in operation 1160, when the processor 120 determines that the UL electric field of the user terminal 200 is strong and the DL electric field of the user terminal 200 is strong for a threshold number of times or more consecutively, the processor 120 may determine not to apply an IMD avoidance algorithm to the user terminal 200. For example, when it is determined for ten times or more consecutively that the UL electric field is strong and the DL electric field is strong, the processor 120 may determine not to apply the IMD avoidance algorithm to the user terminal 200. According to an embodiment, the IMD avoidance algorithm may be the method described with reference to FIGS. 3 and 4, but the disclosure is not limited in this respect.

An embodiment of a determination not to apply the interference avoidance algorithm using total full Tx power information as the UL information and CQI information and MCS information as the DL information has been described with reference to FIG. 11, but other embodiments can be described with reference to the above-described [Table 1]. According to an embodiment, the processor 120 may determine to apply an interference avoidance algorithm.

For example, in the case of HI, the processor 120 may determine that the UL electric field is weak when the low frequency UL total full Tx power is "12" or more, and may determine that the DL electric field is weak when the high frequency DL CQI is less than or equal to "6" or the high frequency DL MCS is less than or equal to "9". When it is determined for ten times or more consecutively that the UL electric field is weak and the DL electric field is weak, the processor 120 may determine to apply the HI avoidance algorithm to the user terminal 200.

In the case of IMD, the processor 120 may determine that the UL electric field is weak when the low frequency UL total full Tx power "12" or more or the high frequency UL total full Tx power "19" or more, and may determine that the DL electric field is weak when the low frequency DL CQI is less than or equal to "6" or the low frequency DL MCS is less than or equal to "9", or the high frequency DL CQI is less than or equal to "6" or the high frequency DL MCS is less than or equal to "9". When it is determined for ten times or more consecutively that the UL electric field is weak and the DL electric field is weak, the processor 120 may determine to apply the IMD avoidance algorithm to the user terminal 200.

Example embodiments in [Table 1] of FIG. 9 have been described with reference to FIGS. 10 and 11. The processor 120 may determine whether to apply an interference avoidance algorithm to the user terminal 200 and adaptively apply the interference avoidance algorithm to the user terminal 200 based on the embodiments of [Table 1].

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor or any other device or circuit capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of various embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A base station in a wireless communication system, comprising:
   a communication module, including communication circuitry, configured to communicate with a user terminal and a cooperative base station, the base station communicating with the user terminal in a first frequency band, and the cooperative base station communicating with the user terminal in a second frequency band;
   memory storing computer-executable instructions; and
   at least one processor including processing circuitry,
   wherein the computer-executable instructions, when executed by the at least one processor individually or collectively, cause the base station to:
      determine whether the user terminal is a terminal in which interference occurs, based on a combination of the first frequency band and the second frequency band; and
      based on determining that the user terminal is a terminal in which interference occurs,
         receive uplink (UL) information and downlink information (DL) in the first frequency band and the second frequency band for the user terminal, from the user terminal and the cooperative base station,
         determine a UL electric field state and a DL electric field state of the user terminal based on the UL information and the DL information,
         determine whether to apply an interference avoidance algorithm to the user terminal based on the UL electric field state and the DL electric field state, and
         apply the interference avoidance algorithm to the user terminal based on determining to apply the interference avoidance algorithm.

2. The base station of claim 1, wherein instructions, when executed by at least one processor, cause the base station to:
   determine whether inter-modulation distortion or harmonic interference occurs in the frequency band combination based on a 3rd generation partnership project (3GPP) standard.

3. The base station of claim 1, wherein instructions, when executed by at least one processor, cause the base station to:
in response to the UL electric field state and the DL electric field state satisfying a predetermined condition, determine not to apply the interference avoidance algorithm to the user terminal.

4. The base station of claim 3, wherein the predetermined condition is the UL electric field state and the DL electric field state being determined to be strong for a threshold number of times or more, consecutively.

5. The base station of claim 1, wherein instructions, when executed by at least one processor, cause the base station to:
determine the UL electric field state based on power head room (PHR) information of the UL information; and
determine the DL electric field state based on channel quality indicator (CQI) information of the DL information.

6. The base station of claim 1, wherein instructions, when executed by at least one processor, cause the base station to:
determine the UL electric field state based on total full Tx power information of the UL information; and
determine the DL electric field state based on CQI information and modulation coding rate (MCS) information of the DL information.

7. The base station of claim 1, wherein the interference avoidance algorithm comprises a single UL operation (SUO) scheme for operating a UL of long term evolution (LTE) frequency division duplexing (FDD) as a UL of time division duplexing (TDD) for the user terminal.

8. The base station of claim 1, wherein the UL information comprises at least one of reception signal-to-interference plus noise ratio (SINR) information, modulation coding scheme (MCS) information, power head room (PHR) information, or total full Tx power information of a physical uplink shared channel (PUSCH).

9. The base station of claim 1, wherein the DL information comprises at least one of channel quality indicator (CQI) information, modulation coding rate (MCS) information, rank indicator (RI) information, reference signals received power (RSRP) information, or measurement report (MR) information.

10. The base station of claim 1, wherein the base station comprises an LTE base station, and the cooperative base station comprises a new radio (NR) base station; or the base station comprises an NR base station and the cooperative base station comprises an LTE base station; and
the base station and the cooperative base station are configured to control different cell groups and transmit and receive signals simultaneously with the user terminal.

11. An operating method of a base station in a wireless communication system, the operating method comprising:
communicating with a user terminal in a first frequency band and communicating with a cooperative base station, the cooperative base station communicating with the user terminal in a second frequency band;
determining whether the user terminal is a terminal in which interference occurs, based on a combination of the first frequency band and the second frequency band;
based on determining that the user terminal is a terminal in which the interference occurs,
receiving uplink (UL) information and downlink (DL) information in the first frequency band and the second frequency band for the user terminal, from the user terminal and the cooperative base station;
determining a UL electric field state and a DL electric field state of the user terminal based on the UL information and the DL information;
determining whether to apply an interference avoidance algorithm to the user terminal based on the UL electric field state and the DL electric field state; and
applying the interference avoidance algorithm to the user terminal based on the determining to apply the interference avoidance algorithm.

12. The operating method of claim 11, further comprising:
determining whether inter-modulation distortion or harmonic interference occurs in the frequency band combination based on a 3rd generation partnership project (3GPP) standard.

13. The operating method of claim 11, further comprising:
in response to the UL electric field state and the DL electric field state satisfying a predetermined condition, determining not to apply the interference avoidance algorithm to the user terminal.

14. The operating method of claim 11, further comprising:
determining the UL electric field state based on power head room (PHR) information of the UL information; and
determining the DL electric field state based on channel quality indicator (CQI) information of the DL information.

15. The operating method of claim 11, further comprising:
determining the UL electric field state based on total full Tx power information of the UL information; and
determining the DL electric field state based on channel quality indicator (CQI) information and modulation coding rate (MCS) information of the DL information.

16. The operating method of claim 11, wherein the interference avoidance algorithm is a single UL operation (SUO) scheme for operating a UL of long term evolution (LTE) frequency division duplexing (FDD) as a UL of time division duplexing (TDD) for the user terminal.

17. The operating method of claim 11, wherein the base station comprises an LTE base station and the cooperative base station comprises a new radio (NR) base station; or
the base station comprises an NR base station and the cooperative base station comprises an LTE base station; and
the base station and the cooperative base station are configured to control different cell groups and transmit and receive signals simultaneously with the user terminal.

18. A non-transitory computer-readable storage medium storing instructions that, when executed by at least one processor of a base station, cause the at least one processor to control the base station to perform operations comprising:
communicating with a user terminal in a first frequency band and communicating with a cooperative base station, the cooperative base station communicating with the user terminal in a second frequency band;
determining whether the user terminal is a terminal in which interference occurs, based on a combination of the first frequency band and the second frequency band;
based on determining that the user terminal is a terminal in which the interference occurs,
receiving uplink (UL) information and downlink (DL) information in the first frequency band and the second frequency band for the user terminal from the user terminal and the cooperative base station;
determining a UL electric field state and a DL electric field state of the user terminal based on the UL information and the DL information;

determining whether to apply an interference avoidance algorithm to the user terminal based on the UL electric field state and the DL electric field state; and
applying the interference avoidance algorithm to the user terminal based on the determining to apply the interference avoidance algorithm.

* * * * *